US012611842B2

(12) United States Patent
Xu et al.

(10) Patent No.: US 12,611,842 B2
(45) Date of Patent: Apr. 28, 2026

(54) SELF-ADHERING ROOFING MEMBRANE

(71) Applicant: SIKA TECHNOLOGY AG, Baar (CH)

(72) Inventors: Shenghua Xu, Shanghai (CN); Yizhe Wei, Shanghai (CN); Qin Wei, Shanghai (CN)

(73) Assignee: SIKA TECHNOLOGY AG, Baar (CH)

( * ) Notice: Subject to any disclaimer, the term of this patent is extended or adjusted under 35 U.S.C. 154(b) by 164 days.

(21) Appl. No.: 18/716,269

(22) PCT Filed: Jan. 17, 2023

(86) PCT No.: PCT/EP2023/051030
§ 371 (c)(1),
(2) Date: Jun. 4, 2024

(87) PCT Pub. No.: WO2023/139072
PCT Pub. Date: Jul. 27, 2023

(65) Prior Publication Data

US 2025/0033321 A1 Jan. 30, 2025

(30) Foreign Application Priority Data

Jan. 18, 2022 (WO) ................ PCT/CN2022/072476

(51) Int. Cl.
*E04D 5/10* (2006.01)
*B32B 5/02* (2006.01)
(Continued)

(52) U.S. Cl.
CPC ............ *B32B 5/022* (2013.01); *B32B 15/085* (2013.01); *B32B 15/088* (2013.01); *B32B 15/20* (2013.01);
(Continued)

(58) Field of Classification Search
CPC ..... E04D 13/155; E04D 13/15; E04D 13/158; E04D 5/149; E04D 5/14; E04D 5/141;
(Continued)

(56) References Cited

U.S. PATENT DOCUMENTS 4,965,119 A * 10/1990 Sancaktar ................ B26D 3/02 428/355 R
6,194,049 B1 * 2/2001 Bindschedler-Galli ..................... B32B 27/36 52/409

(Continued)

FOREIGN PATENT DOCUMENTS

EP 3539767 A1 * 9/2019 ............. B32B 27/30
EP 3593988 A1 * 1/2020 ............. B32B 27/12
WO 2021/196107 A1 10/2021

OTHER PUBLICATIONS

Sep. 15, 2023 International Search Report issued in International Patent Application No. PCT/EP2023/051030.

(Continued)

*Primary Examiner* — Jessica L Laux
(74) *Attorney, Agent, or Firm* — OLIFF PLC.

(57) ABSTRACT

A self-adhering roofing membrane, a fully-adhered roof system and a method for producing a self-adhering roofing membrane, the roofing membrane including a waterproofing layer including at least one polymer P1, a first adhesive layer, a barrier layer including a polymeric film including at least one polymer P2, a second adhesive layer, and optionally a release liner, wherein the first and second adhesive layers are pressure sensitive adhesive layers.

20 Claims, 6 Drawing Sheets

(51) Int. Cl.

| | |
|---|---|
| ***B32B 15/085*** | (2006.01) |
| ***B32B 15/088*** | (2006.01) |
| ***B32B 15/20*** | (2006.01) |
| ***B32B 25/14*** | (2006.01) |
| ***B32B 27/08*** | (2006.01) |
| ***B32B 27/30*** | (2006.01) |
| ***B32B 27/34*** | (2006.01) |
| ***E04D 5/06*** | (2006.01) |

(52) U.S. Cl.

CPC .............. *B32B 25/14* (2013.01); *B32B 27/08* (2013.01); *B32B 27/304* (2013.01); *B32B 27/34* (2013.01); *E04D 5/06* (2013.01); *E04D 5/10* (2013.01); *B32B 2250/05* (2013.01); *B32B 2255/26* (2013.01); *B32B 2264/12* (2013.01); *B32B 2270/00* (2013.01)

(58) Field of Classification Search

CPC ......... E04D 5/142; E04D 5/146; E04D 5/147; B29C 65/02; B29C 65/18; B29C 65/483; B29C 65/4835; B29C 65/4815

See application file for complete search history.

(56) References Cited

U.S. PATENT DOCUMENTS

2013/0157048 A1* 6/2013 Rudolf ...................... E04D 5/10 156/308.2
2015/0307749 A1* 10/2015 Hoshi ........................ C09J 5/00 156/64
2023/0108905 A1* 4/2023 Hubbard ................... E04D 5/10 428/355 R

OTHER PUBLICATIONS

Sep. 15, 2023 Written Opinion issued in International Patent Application No. PCT/EP2023/051030.

* cited by examiner

SELF-ADHERING ROOFING MEMBRANE

TECHNICAL FIELD

The invention relates to the field of waterproofing of above ground building constructions by using self-adhering roofing membranes. In particular, the invention relates to self-adhering roofing membranes, which can be used for providing fully-adhered roof systems.

BACKGROUND OF THE INVENTION

In the field of construction polymeric sheets, which are often referred to as membranes, panels, or sheets, are used to protect underground and above ground constructions, such as basements, tunnels, and flat and low-sloped roofs, against penetration water. Waterproofing membranes are applied, for example, to prevent ingress of water through cracks that develop in concrete structures due to building settlement, load deflection, or concrete shrinkage. Roofing membranes used for waterproofing of flat and low-sloped roof structures are typically provided as single-ply or multi-ply membrane systems. In a single-ply system, the roof substrate is covered using a roofing membrane composed of a single waterproofing layer. In multi-ply membrane systems, roofing membranes comprising multiple waterproofing layers having similar or different composition are used. Single-ply membranes have the advantage of lower production costs compared to the multi-ply membranes, but they are also less resistant to mechanical damages caused by punctures of sharp objects.

Commonly used materials for the roofing membranes include plastics, in particular thermoplastics such as plasticized polyvinylchloride (p-PVC), thermoplastic olefins (TPE-O, TPO), and rubbers, such as ethylene-propylene diene monomer (EPDM). Bituminous materials are also used since they provide good resistance against environmental factors combined with relatively low costs compared to thermoplastic polymer materials. Bitumen compositions are typically modified with synthetic polymers to improve resistance to UV-radiation, toughness, and flexibility at low temperatures. The roofing membranes are typically delivered to a construction site in form of rolls, transferred to the place of installation, unrolled, and adhered to the substrate to be waterproofed. The substrate on which the membrane is adhered may be comprised of variety of materials depending on the installation site. The substrate may, for example, be a concrete, fiber concrete, metal, glass, plastic, or a plywood substrate, or it may include an insulation board or cover board and/or an existing roofing or waterproofing membrane.

Roofing membranes must be securely fastened to the roof substrate to provide sufficient mechanical strength to resist the shearing forces applied on it due to high wind loads. Roof systems are typically divided into two categories depending on the means used for fastening the roofing membrane to roof substrate. In a mechanically attached roof system, the roofing membrane is fastened to the roof substrate by using screws and/or barbed plates. Mechanical fastening enables high strength bonding, but it provides direct attachment to the roof substrate only at locations where a mechanical fastener affixes the membrane to the surface, which makes mechanically attached membranes susceptible to flutter. In fully-adhered roof systems the membrane is typically adhered to the roof substrate indirectly by using an adhesive layer.

Roofing membranes can be adhesively adhered to roof substrates by using a number of techniques including contact bonding and using self-adhering membranes. In contact bonding, both the membrane and the surface of the roof substrate are first coated with a solvent- or water-based contact adhesive after which the membrane is bonded to the surface of the substrate. The volatile components of the contact adhesive are "flashed off" to provide a partially dried adhesive layers prior to contacting the membrane with the substrate. A fully-adhered roof system can also be prepared by using self-adhering roofing membranes having a pre-applied layer of adhesive composition coated on the bottom surface of the membrane. Typically, the pre-applied adhesive layer is covered with a release liner to prevent premature unwanted adhesion and to protect the adhesive layer from moisture, fouling, and other environmental factors. At the time of use the release liner is removed and the roofing membrane is secured to the substrate without using additional adhesives. Roofing membranes having a pre-applied adhesive layer covered by release liner are also known as "peel and stick membranes".

Self-adhering roofing membranes based on plasticized polyvinylchloride (p-PVC) cannot be directly installed to old bitumen or concrete roof substrates due to the poor compatibility of the membrane and roof substrate materials. The membrane material and the roof substrate are considered to be "incompatible" since, the volatile components contained in the bitumen material tend to migrate to the membrane resulting in degradation of the PVC material. On the other hand, cement contained in concrete substrates is an alkaline substance and PVC materials that are direct contact with concrete substrates are suspected to suffer from accelerated aging.

Consequently, direct installation of PVC membranes to bitumen or concrete substrates is generally not recommended due to concerns related to accelerated aging of the PVC material. Furthermore, the migration of plasticizers from the PVC membrane to the adhesive layer may result in deterioration of the adhesive properties and eventually to delamination of the membrane from the surface of the roof substrate. Therefore, a PVC roofing membrane used for providing fully-adhered roof systems is customarily equipped with an isolation layer, such as a layer of a non-woven fabric, which is typically positioned between the membrane and the adhesive layer to isolate the PVC material from the roof substrate. It has however been found out that a non-woven fabric, such as a felt, is less effective preventing the migration volatile compounds from a bitumen substrate to a roofing membrane.

There thus remains a need for a new type of self-adhering roofing membrane that can be directly installed to an "incompatible" roof substrate, such as an old bitumen, concrete, or an old roof tile substrate, without a risk of accelerated aging of the roofing membrane.

SUMMARY OF THE INVENTION

The object of the present invention is to provide a self-adhering roofing membrane, which can be used for providing fully-adhered roof systems without limitations regarding of the type of the roof substrate.

Another object of the present invention is to provide a self-adhering roofing membrane, which enables an easy, quick, and safe solution for renovation of old roofs comprising various substrates.

The subject of the present invention is a self-adhering roofing membrane as defined in claim 1.

It was surprisingly found out that a self-adhering roofing membrane comprising a waterproofing layer, a first pressure sensitive adhesive layer, a barrier layer, and second pressure sensitive adhesive layer, is able to solve or at least mitigate the problems of the State-of-the-Art self-adhering roofing membranes.

One of the advantages of the self-adhering roofing membrane of the present invention is that enables an easy, quick, and safe solution for renovation of roofs comprising various substrates.

Another advantage of the self-adhering roofing membrane of the present invention is that the membranes can be produced using a simplified process that significantly decreases the production costs, since the barrier layer is bonded to the waterproofing layer using a pressure sensitive adhesive. Furthermore, the pressure sensitive adhesive layer between the barrier layer and the waterproofing layer exhibits viscoelastic properties and, consequently a certain "creep behavior" that allows efficient relief of stresses under deformation of the composite structure. Consequently, buckling and delamination of the barrier layer can be effectively avoided in case the roofing membrane is mechanically deformed, for example, during installation at the construction site, or thermally deformed due to fluctuating temperatures and different thermal expansion properties of the membrane materials.

Other aspects of the present invention are presented in other independent claims. Preferred aspects of the invention are presented in the dependent claims.

FIG. 1 shows a cross-section of a self-adhering roofing membrane (1) comprising a waterproofing layer (2), a first adhesive layer (3), a barrier layer (4) composed of a polymeric film (4-1), a second adhesive layer (5), and a release liner (6) covering the outer major surface of the second adhesive layer (5) facing away from the barrier layer (4).

FIG. 2 shows a cross-section of a self-adhering roofing membrane (1) comprising a waterproofing layer (2), a first adhesive layer (3), a barrier layer (4) composed of a polymeric film (4-1), a second adhesive layer (5), a release liner (6) covering the outer major surface of the second adhesive layer (5) facing away from the barrier layer (4), and a reinforcing layer (7) fully embedded into the waterproofing layer (2).

Figure 7:
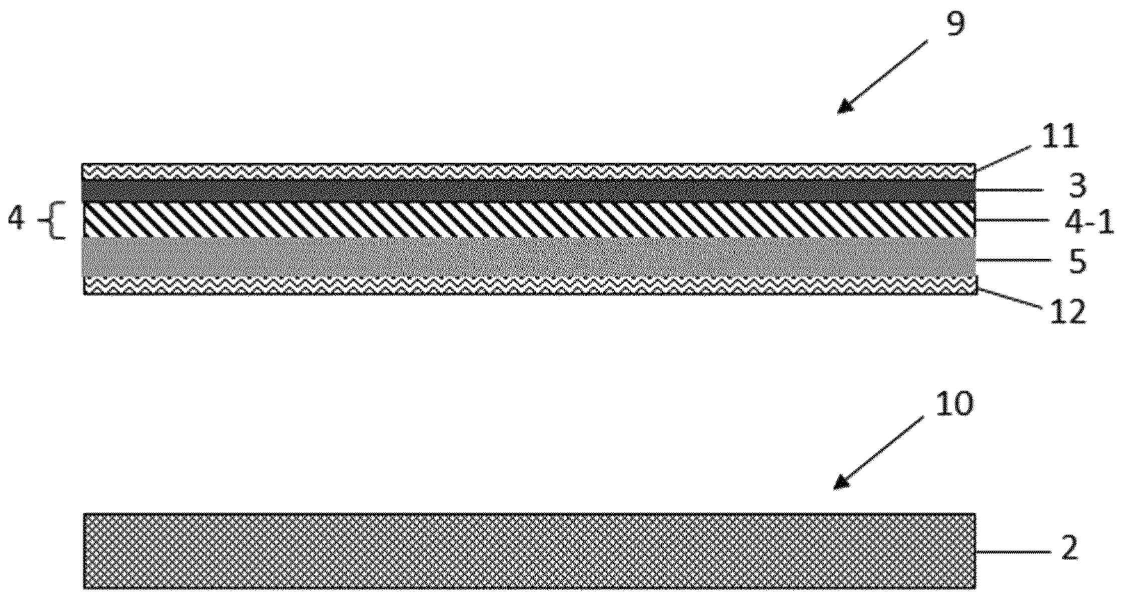

FIG. 7 shows a first kit-of-parts comprising a double-sided self-adhering barrier layer (9) comprising a barrier layer (4) composed of a polymeric film (4-1), a first adhesive layer (3) covering at least a portion of an upper major surface of the barrier layer (4), a second adhesive layer (5) covering at least a portion of the lower major surface of the barrier layer (4), and first and second release liners (11, 12) covering the first and second adhesive layers (3, 5) and a roofing membrane (10) comprising a waterproofing layer (2).

Figure 8:
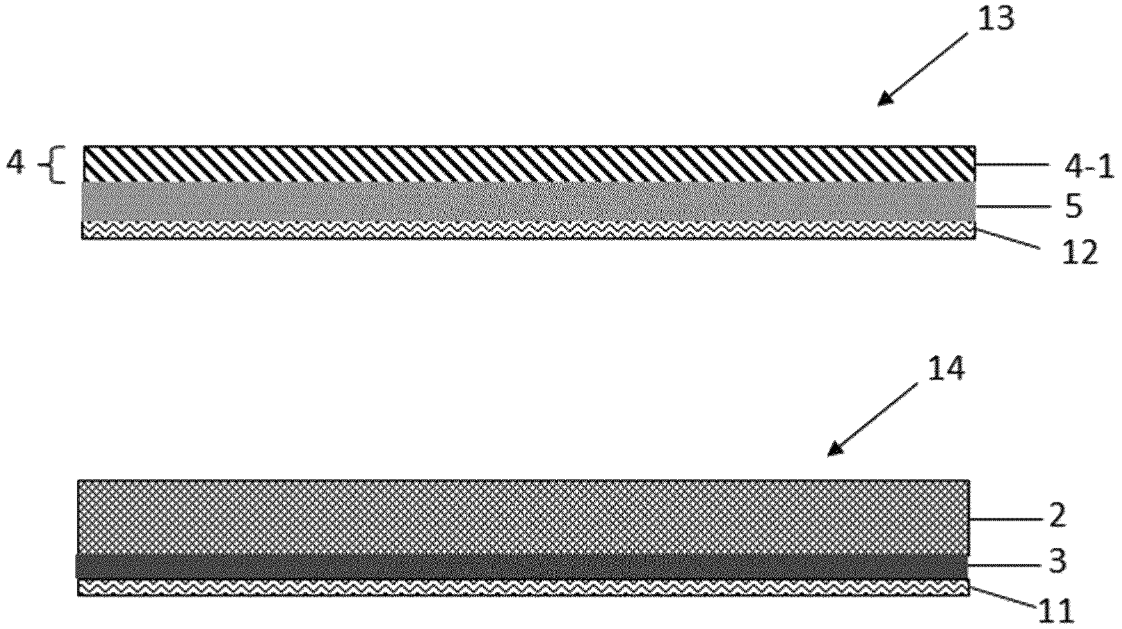

FIG. 8 shows a second kit-of-parts comprising a single-sided self-adhering barrier layer (13) comprising a barrier layer (4) composed of a polymeric film (4-1), a second adhesive layer (5) covering at least a portion of a lower major surface of the barrier layer (4), and a second release liner (12) covering the second adhesive layer (5) and a single-sided self-adhering roofing membrane (14) comprising a waterproofing layer (2), a first adhesive layer (3) covering at least a portion of a lower major surface of the waterproofing layer (2), and a first release liner (11) covering the first adhesive layer (3).

Figure 9:
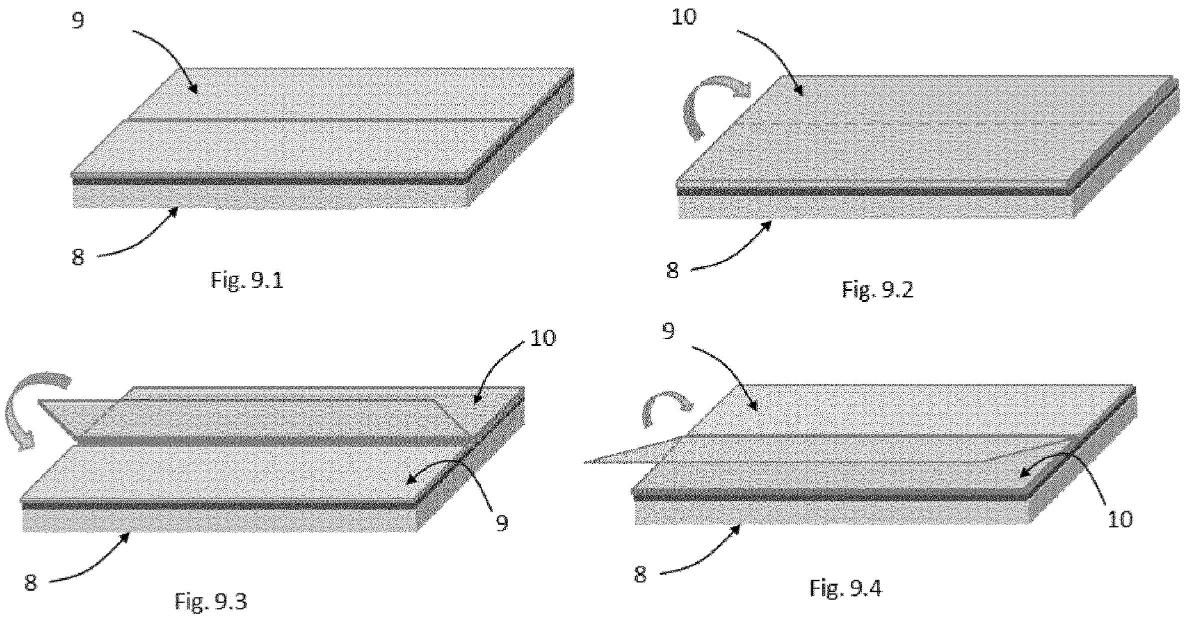

FIGS. 9.1-9.4 show a schematic presentation of a method for sealing a roof substrate (8) using a kit-of-parts comprising a double-sided self-adhering barrier layer (9) and a roofing membrane (10).

DETAILED DESCRIPTION OF THE INVENTION

The subject of the present invention is a self-adhering roofing membrane (1) comprising:

i) A waterproofing layer (2) having a first and a second major surface and comprising at least one polymer P1, ii) A first adhesive layer (3), iii) A barrier layer (4) comprising a polymeric layer (4-1) comprising at least one polymer P2 selected from the group consisting of polyamide, ethylene vinyl alcohol, and polyethylene terephthalate, iv) A second adhesive layer (5), and v) Optionally a release liner (6), wherein the first and second adhesive layers (3, 5) are a pressure sensitive adhesive layer.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight may be determined by gel permeation chromatography (GPC) using polystyrene as standard, styrene-divinylbenzene gel with porosity of 100 Angstrom, 1000 Angstrom and 10000 Angstrom as the column and, depending on the molecule, tetrahydrofurane as a solvent, at 35° C., or 1,2,4-trichlorobenzene as a solvent, at 160° C.

The term "rubber" refers to any polymer or combination of polymers, which is capable of recovering from large deformations, and which can be, or already is, modified to a state in which it is essentially insoluble (but can swell) in a boiling solvent. Typical rubbers are capable of being elongated or deformed to at least 200% of their original dimension under an externally applied force, and will substantially resume the original dimensions, sustaining only small permanent set (typically no more than about 20%), after the external force is released. As used herein, the term "rubber" may be used interchangeably with the term "elastomer".

The term "softening point" refers to a temperature at which compound softens in a rubber-like state, or a temperature at which the crystalline portion within the compound melts. The softening point can be determined by Ring and Ball measurement conducted according to DIN EN 1238 standard.

The term "melting temperature" refers to a temperature at which a material undergoes transition from the solid to the liquid state. The melting temperature ($T_m$) is preferably determined by differential scanning calorimetry (DSC) according to ISO 11357-3 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using an applied frequency of 1 Hz and a strain level of 0.1%.

The "amount or content of at least one component X" in a composition, for example "the amount of the at least one polymer P1" refers to the sum of the individual amounts of all polymers P1 contained in the composition. Furthermore, in case the composition comprises 20 wt.-% of at least one polymer P1, the sum of the amounts of all polymers P1 contained in the composition equals 20 wt.-%.

The term "room temperature" designates a temperature of 23° C.

The self-adhering roofing membrane comprises a waterproofing layer (2), which is a sheet-like element having first and second major surfaces, i.e., top and bottom surfaces. The term "sheet-like element" refers in the present document to elements having a length and width at least 15 times, preferably at least 25 times, more preferably at least 50 times greater than the thickness of the element.

Preferably, the waterproofing layer (2) comprises the at least one polymer P1 in an amount of at least 25 wt.-% more preferably at least 35 wt.-%, even more preferably at least 50 wt.-%, still more preferably at least 65 wt.-%, based on the total weight of the waterproofing layer (2).

Preferably, the at least one polymer P1 is selected from the group consisting of polyvinylchloride (PVC), polyolefins, halogenated polyolefins, rubbers, and ketone ethylene esters (KEE).

Suitable PVC resins for use as the at least one polymer P1 include ones having a K-value determined by using the method as described in ISO 1628-2-1998 standard in the range of 50-85, preferably 65-75. The K-value is a measure of the polymerization grade of the PVC-resin, and it is determined from the viscosity values of the PVC homopolymer as virgin resin, dissolved in cyclohexanone at 30° C.

Term "polyolefin" refers in the present disclosure to homopolymers and copolymers obtained by polymerization of olefin monomers optionally with other types of comonomers. Suitable polyolefins for use as the at least one polymer P1 include, for example, thermoplastic polyolefin elastomers (TPO-E), particularly heterophasic propylene copolymers. Heterophasic polymers are polymer systems comprising a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier.

Suitable commercially available heterophasic propylene copolymers include reactor blends of the base polyolefin and the polyolefin modifier, also known as "in-situ TPOs" or "reactor TPOs or "impact copolymers (ICP)", which are typically produced in a sequential polymerization process, wherein the components of the matrix phase are produced in a first reactor and transferred to a second reactor, where the components of the dispersed phase are produced and incorporated as domains in the matrix phase. Heterophasic propylene copolymers comprising polypropylene homopolymer as the base polymer are often referred to as "heterophasic propylene copolymers (HECO)" whereas heterophasic propylene copolymers comprising polypropylene random copolymer as the base polymer are often referred to as "heterophasic propylene random copolymers (RAHECO) ". The term "heterophasic propylene copolymer" encompasses in the present disclosure both the HECO and RAHECO types of the heterophasic propylene copolymers.

Suitable rubbers for use as the at least one polymer P1 include, for example, styrene-butadiene rubber (SBR), ethylene propylene diene monomer (EPDM), butyl rubber, polyisoprene, polybutadiene, natural rubber, polychloroprene rubber, ethylene-propylene rubber (EPR), nitrile rubber, acrylic rubber, ethylene vinyl acetate rubber, and silicone rubber, and chemically crosslinked versions of the aforementioned rubbers.

According to one or more embodiments, the at least one polymer P1 is selected from the group consisting of polyvinylchloride, polyolefins, halogenated polyolefins, and ethylene propylene diene monomer (EPDM), preferably from the group consisting of polyvinylchloride and polyolefins, and ethylene propylene diene monomer (EPDM), more preferably from the group consisting of polyvinylchloride and the thermoplastic polyolefin elastomers (TPO-E).

The detailed composition of the waterproofing layer (2) is not particularly restricted. However, the composition of the waterproofing layer should be selected such that the roofing membrane fulfils the general requirements for roofing membranes used for providing fully-adhered roof systems, in particular the general requirements as defined in DIN 20000-201:2015-08 standard.

It may, for example, be preferred that the composition of the waterproofing layer is selected such that the self-adhering roofing membrane shows an impact resistance measured according to EN 12691:2005 standard in the range of 200-1500 mm and/or a longitudinal and a transversal tensile strength measured at a temperature of 23° C. according to DIN ISO 527-3 standard of at least 5 MPa and/or a longitudinal and transversal elongation at break measured at a temperature of 23° C. according to DIN ISO 527-3 standard of at least 300% and/or a water resistance measured according to EN 1928 B standard of 0.6 bar for 24 hours and/or a maximum tear strength measured according to EN 12310-2 standard of at least 100 N.

According to one or more embodiments, the waterproofing layer (2) is a polyvinylchloride membrane, preferably comprising:

a) 25-65 wt.-% of a polyvinylchloride resin, as the at least one polymer P1,
b) 15-50 wt.-% of at least one plasticizer for polyvinylchloride resin, and
c) 0-30 wt.-% of at least one inorganic filler, all proportions being based on the total weight of the polyvinylchloride membrane.

Preferably, the polyvinylchloride resin has a K-value determined by using the method as described in ISO 1628-2-1998 standard in the range of 50-85, more preferably 65-75.

Preferably, the composition of the waterproofing layer (2) has a glass transition temperature ($T_g$), determined by dynamical mechanical analysis (DMA) using an applied frequency of 1 Hz and a strain level of 0.1%, of below −20° C., more preferably below-25° C.

The type of the at least one plasticizer for polyvinylchloride resin is not particularly restricted in the present invention. Suitable plasticizers for the PVC-resin include but are not restricted to, for example, linear or branched phthalates such as di-isononyl phthalate (DINP), di-nonyl phthalate (L9P), diallyl phthalate (DAP), di-2-ethylhexyl-phthalate (DEHP), dioctyl phthalate (DOP), diisodecyl phthalate (DIDP), and mixed linear phthalates (911P). Other suitable plasticizers include phthalate-free plasticizers, such as trimellitate plasticizers, adipic polyesters, and biochemical plasticizers. Examples of biochemical plasticizers include epoxidized vegetable oils, for example, epoxidized soybean oil and epoxidized linseed oil and acetylated waxes and oils derived from plants, for example, acetylated castor wax and acetylated castor oil.

Particularly suitable phthalate-free plasticizers to be used in the waterproofing layer include alkyl esters of benzoic acid, dialkyl esters of aliphatic dicarboxylic acids, polyesters of aliphatic dicarboxylic acids or of aliphatic di-, tri- and tetrols, the end groups of which are unesterified or have been esterified with monofunctional reagents, trialkyl esters of citric acid, acetylated trialkyl esters of citric acid, glycerol esters, benzoic diesters of mono-, di-, tri-, or polyalkylene glycols, trimethylolpropane esters, dialkyl esters of cyclohexanedicarboxylic acids, dialkyl esters of terephthalic acid, trialkyl esters of trimellitic acid, triaryl esters of phosphoric acid, diaryl alkyl esters of phosphoric acid, trialkyl esters of phosphoric acid, and aryl esters of alkanesulphonic acids.

According to one or more embodiments, the at least one plasticizer for the PVC resin is selected from the group consisting of phthalates, trimellitate plasticizers, adipic polyesters, and biochemical plasticizers.

Suitable inorganic fillers for use in the PVC membrane include sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The term “sand” refers in the present document to mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%. The term “calcium carbonate” as inert inorganic filler refers in the present document to calcitic fillers produced from chalk, limestone, or marble by grinding and/or precipitation.

According to one or more embodiments, the at least one inorganic filler is present in the PVC membrane in an amount of 5-30 wt.-%, preferably 10-30 wt.-%, more preferably, 15-30 wt.-%, based on the total weight of the PVC membrane.

The PVC membrane can further comprise one or more additives, for example, UV- and heat stabilizers, antioxidants, flame retardants, dyes, pigments such as titanium dioxide and carbon black, matting agents, antistatic agents, impact modifiers, biocides, and processing aids such as lubricants, slip agents, antiblock agents, and denest aids.

The thickness of the waterproofing layer (2) is not particularly restricted. According to one or more embodiments, the waterproofing layer (2) has a thickness of 0.1-5.0 mm, preferably 0.35-3.5 mm, more preferably 0.5-2 mm, even more preferably 0.5-1.5 mm, most preferably 0.7-1.2 mm. A thickness of a polymeric layer can be determined, for example, by using the measurement method as defined in DIN EN 1849-2 standard.

It may be preferred to include a reinforcing layer to the structure of the self-adhering roofing membrane to improve mechanical properties of the membrane. The reinforcing layer may be fully embedded into the waterproofing layer (2) or adhered to one of the major surfaces of the waterproofing layer (2). The expression “fully embedded” is understood to mean that the reinforcing layer is fully covered by the matrix of one of the waterproofing layers (2).

According to one or more embodiments, the self-adhering roofing membrane comprises a reinforcing layer (7) that is fully embedded into the waterproofing layer (2) or adhered to one of the major surfaces of the waterproofing layer (2), wherein the reinforcing layer (7) is selected from non-woven fabrics, woven fabrics, and laid scrims comprising synthetic organic and/or inorganic fibers.

The term “non-woven fabric” refers in the present disclosure to materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the nonwoven fabric. In chemical bonding, chemical binders such as adhesive materials are used to hold the fibers together in a non-woven fabric. Typical materials for the non-woven fabrics include synthetic organic and inorganic fibers.

The term “laid scrim” refers in the present disclosure web-like non-woven products composed of at least two sets of parallel yarns (also designated as weft and warp yarns), which lay on top of each other and are chemically bonded to each other. The yarns of a non-woven scrim are typically arranged with an angle of 60-120°, such as 90±5°, towards each other thereby forming interstices, wherein the interstices occupy more than 60% of the entire surface area of the laid scrim.

According to one or more embodiments, the synthetic organic fibers of the reinforcing layer are selected from polyethylene, polypropylene, polyester, nylon, and aramid fibers.

According to one or more embodiments, the inorganic fibers of the reinforcing layer are selected from glass, carbon, metal, and wollastonite fibers.

Figure 2:
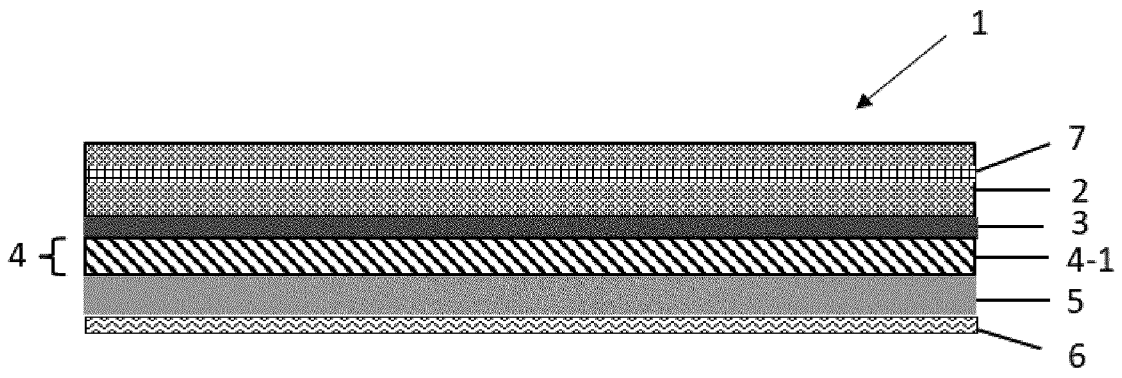

According to one or more embodiments, the self-adhering roofing membrane comprises a reinforcing layer (7) that is fully embedded into the waterproofing layer (2), wherein the reinforcing layer (7) is selected from non-woven fabrics, woven fabrics, and laid scrims comprising synthetic organic and/or inorganic fibers. One example of a self-adhering roofing membrane according to these embodiments is shown in FIG. 2.

According to one or more further embodiments, the self-adhering roofing membrane comprises a reinforcing layer (7) selected from non-woven fabrics, woven fabrics, and laid scrims comprising synthetic organic and/or inorganic fibers, wherein the reinforcing layer (7) has been thermally laminated to one of the major surfaces of the waterproofing layer (2), such as to the second major surface of the waterproofing layer (2), in a manner that gives direct bonding between the reinforcing layer (7) and the waterproofing layer (2).

The self-adhering roofing membrane further comprises a first adhesive layer (3) that is a pressure sensitive adhesive layer.

The term "pressure sensitive adhesive layer" designates in the present disclosure an adhesive layer, which is composed of one or more pressure sensitive adhesives.

The term "pressure sensitive adhesive (PSA)" designates in the present disclosure viscoelastic materials, which adhere immediately to almost any kind of substrates by application of light pressure, and which are permanently tacky. The tackiness of an adhesive layer can be measured, for example, as a loop tack.

One of the advantages obtained by using a pressure sensitive adhesive for bonding the barrier layer to the waterproofing layer is that due to its viscoelastic properties, the pressure sensitive layer adhesive exhibits certain "creep behavior" that allows efficient relief of stresses induced by deformation of the roofing membrane. Consequently, buckling and delamination of the barrier layer can be effectively avoided when the membrane is subjected to mechanical deformation, for example, during installation at the construction site. Stresses and deformation of the membrane may also arise during temperature fluctuations due to the different thermal expansion properties of the membrane materials.

Suitable pressure sensitive adhesives for use in the first adhesive layer (3) include, for example, acrylic adhesives and synthetic rubber-, natural rubber-, and bitumen-based adhesives.

Suitable rubbers for use in a synthetic rubber-based pressure sensitive adhesive include for example, styrene block copolymers, vinyl ether polymers, styrene-butadiene rubber (SBR), ethylene propylene diene monomer (EPDM), butyl rubber, polyisoprene, polybutadiene, polychloroprene rubber, ethylene-propylene rubber (EPR), nitrile rubber, acrylic rubber, ethylene vinyl acetate rubber, or silicone rubber.

Suitable bitumen-based pressure sensitive adhesives typically comprise one of more different types of bitumen materials mixed with one or more modifying polymers to improve the resistance to UV-radiation, toughness, and flexibility at low temperatures.

In addition to the above-mentioned constituents, suitable pressure sensitive adhesives typically comprise one or more additional constituents including, for example, tackifying resins, waxes, and additives, for example, UV-light absorption agents, UV- and heat stabilizers, optical brighteners, pigments, dyes, and desiccants.

According to one or more embodiments, the first adhesive layer (3) is an acrylic pressure sensitive adhesive layer. The term "acrylic adhesive" designates in the present disclosure adhesive compositions containing one or more acrylic polymers as the main polymer component.

The term "acrylic polymer" designates in the present disclosure homopolymers, copolymers and higher interpolymers of an acrylic monomer with one or more further acrylic monomers and/or with one or more other ethylenically unsaturated monomers. The term "monomer" refers to a compound that chemically bonds to other molecules, including other monomers, to form a polymer. The term "acrylic monomer" refers to monomers having at least one (meth)acryloyl group in the molecule. The term "(meth) acryloyl" designates methacryloyl or acryloyl. Accordingly, the term "(meth)acrylic" designates methacrylic or acrylic. A (meth)acryloyl group is also known as (meth)acryl group.

The polymer chains of the acrylic polymers contained in the pressure sensitive adhesive layer may be non-crosslinked or physically or chemically crosslinked. Furthermore, the polymer chains of the acrylic polymers may be present in the pressure sensitive adhesive layer as part of a chemically crosslinked polymer network comprising other polymers than acrylic polymers or as part of an interpenetrating or semi-interpenetrating polymer network (IPN).

The term "interpenetrating polymer network" refers to a polymer network comprising two or more dissimilar polymers that are in network form, i.e., chemically, or physically crosslinked. In an IPN, the polymer chains are not chemically bonded, but they are physically entangled by permanent chain entanglements. In a semi-interpenetrating polymer network, the polymer network and a linear or branched polymer penetrate each other at the molecular level.

The advantage of using an acrylic pressure sensitive adhesive layer as the first adhesive layer is that acrylic PSAs have been found out to be highly compatible with plasticized polyvinylchloride membranes. For the present invention this means that the plasticizers contained in the waterproofing layer do not migrate to the first adhesive layer increasing the risk of deterioration of adhesive properties and delamination of the barrier layer form the waterproofing layer.

According to one or more embodiments, first adhesive layer (3) comprises at least 35 wt.-%, preferably at least 50 wt.-%, more preferably at least 75 wt.-%, even more preferably at least 85 wt.-%, of at least one acrylic polymer AP, based on the total weight of the first adhesive layer (3).

Examples of suitable acrylic monomers for use in the at least one acrylic polymer AP include, for example, (meth) acrylates, (meth)acrylic acid or derivatives thereof, for example, amides of (meth)acrylic acid or nitriles of (meth) acrylic acid, and (meth)acrylates with functional groups such as hydroxyl group-containing (meth)acrylates and alkyl (meth)acrylates.

According to one or more embodiments, the acrylic polymer AP has been obtained from a monomer mixture comprising at least 45 wt.-%, preferably at least 55 wt.-%, more preferably at least 65 wt.-%, even more preferably at least 75 wt.-%, still more preferably at least 85 wt.-%, based on the total weight of the monomer mixture, of at least one acrylic monomer AM of formula (I):

(I)

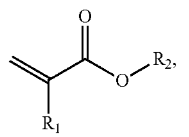

where $R_1$ represents a hydrogen or a methyl group; and $R_2$ represents a branched, unbranched, cyclic, acyclic, or saturated alkyl group having from 2 to 30 carbon atoms.

Examples of suitable acrylic monomers of formula (I) include methyl acrylate, methyl methacrylate, ethyl acrylate, ethoxy ethoxy ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, as for example isobutyl acrylate, 2-ethylhexyl acrylate, 2-ethylhexyl methacrylate, isooctyl acrylate, isooctyl methacrylate, and also cyclohexyl methacrylate, isobornyl acrylate, isobornyl methacrylate or 3,5-dimethyladamantyl acrylate.

Suitable comonomers to be used with the acrylic monomers of formula (I) include, for example, hydroxyl group containing acrylic monomers, such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl butyl (meth)acrylate, 2-hydroxy-hexyl (meth)acrylate, 6-hydroxy hexyl(meth)acrylate, 8-hydroxyoctyl(meth)acrylate, 10-hydroxydecyl(meth)acrylate, 12-hydroxylauryl (meth)acrylate. Further suitable hydroxyl group containing acrylic monomers include (4-hydroxymethyl cyclohexyl)methyl acrylate, polypropylene glycol mono(meth)acrylate, N-hydroxyethyl (meth)acrylamide, and N-hydroxypropyl (meth)acrylamide, esters of hydroxyethyl (meth)acrylate and phosphoric acid, and trimethoxysilylpropyl methacrylate.

According to one or more embodiments, the monomer mixture used for obtaining the at least one acrylic polymer AP comprises not more than 25 wt.-%, preferably not more than 20 wt.-%, such as 0.01-15 wt.-%, preferably 0.1-10 wt.-%, based on the total weight of the monomer mixture, of at least one hydroxyl group containing acrylic monomer.

Further suitable comonomers for the synthesis of the at least one acrylic polymer AP include vinyl compounds, such as ethylenically unsaturated hydrocarbons with functional groups, vinyl esters, vinyl halides, vinylidene halides, nitriles of ethylenically unsaturated hydrocarbons, phosphoric acid esters, and zinc salts of (meth)acrylic acid. Examples of especially suitable vinyl compounds include, for example, maleic anhydride, styrene, styrenic compounds, acrylic acid, beta-acryloyloxypropionic acid, vinylacetic acid, fumaric acid, crotonic acid, aconitic acid, trichloroacrylic acid, itaconic acid, vinyl acetate, and acryloyl morpholine.

According to one or more embodiments, the monomer mixture used for obtaining the at least one acrylic polymer AP comprises at least 0.1 wt.-%, preferably at least 0.5 wt.-%, such as 0.1-20 wt.-%, preferably 0.5-15 wt. %, based on the total weight of the monomer mixture, of at least one vinyl compound, preferably selected from the group consisting of maleic anhydride, styrene, styrenic compounds, (meth)acrylamides, N-substituted (meth)acrylamides, acrylic acid, beta-acryloyloxypropionic acid, vinylacetic acid, fumaric acid, crotonic acid, aconitic acid, dimethylacrylic acid, trichloroacrylic acid, itaconic acid, vinyl acetate, and amino group-containing (meth)acrylates.

According to one or more embodiments, the at least one acrylic polymer AP has a glass transition temperature ($T_g$), determined by dynamical mechanical analysis (DMA) using an applied frequency of 1 Hz and a strain level of 0.1%, of below 0° C., preferably below −20° C. and/or a number average molecular weight ($M_n$) determined by gel permeation chromatography using polystyrene as standard of 50ß00-1'000'000 g/mol, preferably 100'000-750'000 g/mol, more preferably 150'000-500'000 g/mol.

According to one or more embodiments, the first adhesive layer (3) is a dried layer of a water- or solvent-based acrylic pressure sensitive adhesive composition or a cured layer of a UV- or electron beam curable acrylic pressure sensitive adhesive composition.

The term "water-based pressure sensitive adhesive composition" designates in the present disclosure pressure sensitive adhesives, which have been formulated as an aqueous dispersion, an aqueous emulsion, or as an aqueous colloidal suspension. The term "aqueous dispersion" or "aqueous emulsion" refers to dispersions or emulsions containing water as the main continuous (carrier) phase. Typically, a water-based pressure sensitive adhesive composition comprises surfactants to stabilize the hydrophobic polymer particles and to prevent these from coagulating with each other.

The term "solvent-based pressure sensitive adhesive composition" designates in the present disclosure pressure sensitive adhesives comprising acrylic polymers, which are substantially completely dissolved in the organic solvent(s). Typically, the organic solvent(s) comprise at least 20 wt.-%, preferably at least 30 wt.-%, more preferably at least 40 wt.-%, of the total weight of the solvent-based pressure sensitive adhesive composition. The term "organic solvent" refers in the present document to organic substances that are liquid at a temperature of 25° C., are able to dissolve another substance at least partially, and have a standard boiling point of not more than 225° C., preferably not more than 200° C. The term "standard boiling point" refers in the present disclosure to boiling point measured at a pressure of 1 bar. The standard boiling point of a substance or composition can be determined, for example, by using an ebulliometer.

Suitable organic solvents for the solvent-based pressure sensitive adhesive composition include, for example, alcohols, aliphatic and aromatic hydrocarbons, ketones, esters, and mixtures thereof. It is possible to use only a single organic solvent or a mixture of two or more organic solvents. Suitable solvent-based pressure sensitive adhesive compositions are substantially water-free, for example, containing less than 10 wt.-%, preferably less than 5 wt.-%, more preferably less than 1 wt.-% of water, based on the total weight of the solvent-based pressure sensitive adhesive.

The term "UV-curable acrylic pressure sensitive adhesive composition" refers to acrylic pressure sensitive adhesives, which can be cured by initiation of photochemical curing reactions by UV-irradiation. In analogy, the term "electron beam curable acrylic pressure sensitive adhesive composition" refers to acrylic pressure sensitive adhesives, which can be cured by initiation of photochemical curing reactions by accelerated electrons. The term "curing" in the present disclosure to chemical reactions comprising forming of bonds resulting, for example, in chain extension and/or crosslinking of polymer chains.

According to one or more embodiments, the water- or solvent-based acrylic pressure sensitive adhesive composition comprises:

A1) 25-85 wt.-%, preferably 35-75 wt.-%, of the at least one acrylic polymer AP and B1) 5-85 wt.-%, preferably 10-75 wt.-%, of water or at least one organic solvent, all proportions being based on the total weight of the water- or solvent-based acrylic pressure sensitive adhesive composition.

In addition to the at least one acrylic polymer AP, the water- or solvent-based acrylic pressure sensitive adhesive composition may further comprise one or more additional constituents including, for example, tackifying resins, waxes, and plasticizers as well as one or more additives, such as UV-light absorption agents, UV- and heat stabilizers, optical brighteners, pigments, dyes, and desiccants. Preferably, the total amount of such additional constituents and additives is not more than 35 wt.-%, more preferably not more than 25 wt.-%, most preferably not more than 15 wt.-%, based on the total weight of the water- or solvent-based acrylic pressure sensitive adhesive composition.

According to one or more further embodiments, the UV-curable acrylic pressure sensitive adhesive composition is an UV-curable acrylic hot-melt pressure sensitive adhesive composition comprising:

A2) At least 65 wt.-%, preferably at least 85 wt.-%, of at least one UV-curable acrylic polymer UV-AP having one or more photo initiator groups, B2) 0-15 wt.-%, preferably 0.1-10 wt.-%, of at least one reactive diluent, and C2) 0-20 wt.-%, preferably 1-15 wt.-%, of the at least one filler F, all proportions being based on the total weight of the UV-curable acrylic hot-melt pressure sensitive adhesive composition.

The at least one UV-curable acrylic polymer UV-AP comprises polymerized units that serve as photoinitiators. Suitable polymerized units that serve as photo initiators may be obtained by using copolymerizable photo initiators, such as acetophenone and benzophenone derivatives.

According to one or more embodiments, the at least one UV-curable acrylic polymer UV-AP comprises 0.05-10 wt.-%, preferably 0.1-5 wt.-%, more preferably 0.1-1.5 wt.-%, based on the weight of the polymer UV-AP, of at least one ethylenically unsaturated compound having a photo initiator group.

Suitable compounds for use as the at least one filler F include, for example, sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

Preferably, the at least one filler F has a median particle size $d_{50}$ of not more than 150 μm, more preferably not more than 100 μm. According to one or more embodiments, the at least one solid filler F has a median particle size $d_{50}$ of 0.1-100 μm, preferably 0.15-50 μm, more preferably 0.15-25 μm, even more preferably 0.25-15 μm.

The term "particle size" refers in the present disclosure to the area-equivalent spherical diameter of a particle ($X_{area}$). The term "median particle size $d_{50}$" refers to a particle size below which 50% of all particles by volume are smaller than the $d_{50}$ value. In analogy, the term doo particle size refers in the present disclosure to a particle size below which 90% of all particles by volume are smaller than the doo value and term "$d_{10}$ particle size" refers to a particle size below which 10% of all particles by volume are smaller than the $d_{10}$ value. A particle size distribution can be measured by laser diffraction according to the method as described in standard ISO 13320:2009 using a wet or dry dispersion method and for example, a Mastersizer 2000 device (trademark of Malvern Instruments Ltd, GB).

Suitable UV-curable acrylic hot-melt pressure sensitive adhesive compositions are commercially available, for example, under the trade name of acResin® (from BASF); under the trade name of AroCure® (form Ashland Chemical); and under the trade name of NovaMeltRC® (from Henkel).

According to one or more embodiments, the UV-curable acrylic pressure sensitive adhesive composition is an UV-curable acrylic hot-melt pressure sensitive adhesive composition comprising:

A3) at least 65 wt.-%, preferably at least 75 wt.-%, of the at least acrylic polymer AP, B3) 0-30 wt.-%, preferably 5-20 wt.-%, of at least one tackifying resin TR, C3) 0-5 wt.-%, preferably 0.01-1 wt.-%, of at least one cross-linking agent CA, D3) 0.1-5 wt.-%, preferably 0.25-2.5 wt.-%, of at least one photoinitiator PI, all proportions being based on the total weight of the UV-curable acrylic hot-melt pressure sensitive adhesive composition.

The term "tackifying resin" designates in the present disclosure resins that in general enhance the adhesion and/or tackiness of an adhesive composition. The term "tackiness" designates in the present disclosure the property of a substance of being sticky or adhesive by simple contact. The tackiness can be measured, for example, as a loop tack. Preferred tackifying resins are tackifying at a temperature of 25° C. or below.

Examples of suitable compounds to be used as the at least one tackifying resin TR include natural resins, synthetic resins and chemically modified natural resins.

Examples of suitable natural resins and chemically modified natural resins include rosins, rosin esters, phenolic modified rosin esters, and terpene resins. The term "rosin" is to be understood to include gum rosin, wood rosin, tall oil rosin, distilled rosin, and modified rosins, for example dimerized, hydrogenated, maleated and/or polymerized versions of any of these rosins.

Suitable terpene resins include copolymers and terpolymers of natural terpenes, such as styrene/terpene and alpha methyl styrene/terpene resins; polyterpene resins generally resulting from the polymerization of terpene hydrocarbons, such as the bicyclic monoterpene known as pinene, in the presence of Friedel-Crafts catalysts at moderately low temperatures; hydrogenated polyterpene resins; and phenolic modified terpene resins including hydrogenated derivatives thereof.

The term "synthetic resin" refers to compounds obtained from the controlled chemical reactions such as polyaddition or polycondensation between well-defined reactants that do not themselves have the characteristic of resins.

Monomers that may be polymerized to synthesize the synthetic resins may include aliphatic monomer, cycloaliphatic monomer, aromatic monomer, or mixtures thereof. Aliphatic monomers can include C4, C5, and C6 paraffins, olefins, and conjugated diolefins. Examples of aliphatic monomer or cycloaliphatic monomer include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1,3-hexadiene, 1,4-hexadiene, cyclopentadiene, dicyclopentadiene, and terpenes. Aromatic monomer can include $C_8$, $C_9$, and $C_{10}$ aromatic monomer. Examples of aromatic monomer include styrene, indene, derivatives of styrene, derivatives of indene, coumarone, and combinations thereof.

Particularly suitable synthetic resins include synthetic hydrocarbon resins made by polymerizing mixtures of unsaturated monomers that are obtained as by-products of cracking of natural gas liquids, gas oil, or petroleum naphthas. Synthetic hydrocarbon resins obtained from petroleum-based feedstocks are referred in the present disclosure as "hydrocarbon resins" or "petroleum hydrocarbon resins". These include also pure monomer aromatic resins, which are made by polymerizing aromatic monomer feedstocks that have been purified to eliminate color causing contaminants and to precisely control the composition of the product. Hydrocarbon resins typically have a relatively low average molecular weight ($M_n$), such in the range of 250-5000 g/mol and a glass transition temperature, determined by dynamical mechanical analysis (DMA) as the peak of the measured loss modulus (G") curve using an applied frequency of 1 Hz and a strain level of 0.1%, of above 0° C., preferably equal to or higher than 15° C., more preferably equal to or higher than 30° C.

Examples of suitable hydrocarbon resins include $C_5$ aliphatic hydrocarbon resins, mixed $C_5$/$C_9$ aliphatic/aromatic hydrocarbon resins, aromatic modified $C_5$ aliphatic hydrocarbon resins, cycloaliphatic hydrocarbon resins, mixed $C_5$ aliphatic/cycloaliphatic hydrocarbon resins, mixed $C_9$ aromatic/cycloaliphatic hydrocarbon resins, mixed $C_5$ aliphatic/cycloaliphatic/$C_9$ aromatic hydrocarbon resins, aromatic modified cycloaliphatic hydrocarbon resins, $C_9$ aromatic hydrocarbon resins, polyterpene resins, and copolymers and terpolymers of natural terpenes as well hydrogenated versions of the aforementioned hydrocarbon resins. The notations "$C_5$" and "$C_9$" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%.

Suitable hydrocarbon resins are commercially available, for example, under the trade name of Wingtack® series, Wingtack® Plus, Wingtack® Extra, and Wingtack® STS (all from Cray Valley); under the trade name of Escorez® 1000 series, Escorez® 2000 series, and Escorez® 5000 series (all from Exxon Mobile Chemical); under the trade name of Novares® T series, Novares® TT series, Novares® TD series, Novares® TL series, Novares® TN series, Novares® TK series, and Novares® TV series (all from Rain Carbon); and under the trade name of Kristalex®, Plastolyn®, Piccotex®, Piccolastic® and Endex® (all from Eastman Chemicals).

According to one or more embodiments, the at least one tackifying resin TR has:

- a softening point measured by a Ring and Ball method according to DIN EN 1238 standard in the range of 65-200° C., preferably 75-175° C., more preferably 80-170° C. and/or
- an average molecular weight ($M_n$) in the range of 150-5000 g/mol, preferably 250-3500 g/mol, more preferably 250-2500 g/mol and/or
- a glass transition temperature ($T_g$) determined by dynamical mechanical analysis (DMA) as the peak of the measured loss modulus (G") curve using an applied frequency of 1 Hz and a strain level of 0.1% of at or above 0° C., preferably at or above 15° C., more preferably at or above 25° C., even more preferably at or above 30° C., still more preferably at or above 35° C.

The at least one cross-linking agent CA is preferably a multifunctional acrylate selected from the group consisting of butanediol di(meth)acrylate, ethyleneglycol di(meth) acrylate, diethyleneglycol di(meth)acrylate, triethyleneglycol di(meth)acrylate, trimethylolpropane trimethacrylate, hexanediol diacrylate, trimethylolpropane triacrylate, and tripropyleneglycol diacrylate, trimethylolpropane ethoxy triacrylate, trimethylolpropane triacrylate, tripropylene glycol diacrylate, propylene glycol di(meth)acrylate, dipropylene glycol diacrylate, dipentaerythritol hydroxy pentaacrylate, neopentyl glycol propoxylate diacrylate, bisphenol A ethoxylate di(meth)acrylate, alkoxylated hexanediol diacrylate, ethoxylated bisphenol A diacrylate, ethoxylated bisphenol A di(meth)acrylate, ethoxylated trimethylolpropane triacrylate, propoxylated neopentyl glycol diacrylate, propoxylated glyceryl triacrylate, and polybutadiene di(meth)acrylate.

Suitable compounds for use as the at least one photoinitiator PI include free radical photo initiators and cationic photo initiators, especially free radical photo initiators. Suitable compounds for use as photoinitiators include, for example, benzoic ethers, dialkoxyacetophenones, alpha-hydroxycyclohexyl aryl ketones, alpha-ketophenylacetate esters, benzyldialkylketals, chloro- and alkylthioxanthones and alpha-amino- and alpha-hydroxyalkyl aryl ketones.

Selection of the type of the at least one photoinitiator depends on the wavelength of the UV-radiation used for curing of the adhesive.

According to one or more embodiments, the at least one photoinitiator PI is a free radical photo initiator, which can be activated with UV-A irradiation, such as with UVA-1 irradiation.

Preferred photoinitiators showing absorption in the UVA-1 irradiation wavelength range include so called Norrish type I initiators as well as some Norrish type II initiators.

Especially suitable Norrish type I photoinitiators include phospine oxides (PO), such as diphenyl(2,4,6-trimethylbenzoyl) phosphine oxide (TPO), ethyl phenyl(2,4,6-trimethylbenzoyl)phosphinate (TPO-L), phenylbis(2,4,6-trimethylbenzoyl) phosphine oxide (BAPO), bis-(2,6-dimethoxybenzoyl)-2,4,4-trimethylpentylphosphine oxide (BAPO-1), 2-benzyl-2-(dimethylamino)-4-morpholino-butyrophenone (BDMB), and phenyl-bis-(2,4,6-trimethylbenzoyl) phosphine oxide (BAPO-2). These are commercially available, for example, under the trade name of Omnirad (from IGM Resins), Genocure (from Rahn AG), Speedcure (from Lambson (part of Arkema), Songcure (from Songwon), and Photoinitiators from Bodo Möller Chemie.

Suitable Norrish type II photoinitiators include thiozanthones (TX), for example, 2-Isopropylthioxanthone (ITX), thioxanthone-anthracene (TX-A), 2,4-diethylthioxanthone (DETX), 2-Chlorothioxanthone (CTX), 2,4-Dimethylthioxanthone (RTX), 2,4-diisopropylthioxanthone (DITX), 1-Chloro-4-propoxythioxanthone (CPTX); polymeric TXs such as polymeric CPTX, polyTHF-di(thioxanthone-2-oxy-acetate); and dl-camphorquinine 2,3-bornanedione (CQ). These are commercially available, for example, under the trade names of Genocure® (from Rahn GmbH), Omnirad® (from IGM resins), and SpeedCure® (from Lambson).

Furthermore, the photoinitiators may be used in combination with synergists/activators that are well known to skilled person. The preferred type of the synergist depends on the type of the photoinitiator, for example the radical formation with Norrish type II initiators requires a hydrogen donor as a synergist. Examples of suitable synergists for the Norrish II initiators include, for example, amino benzoates, acrylated amines, and thiol compounds.

According to one or more further embodiments, the UV-curable acrylic pressure sensitive adhesive composition is an UV-curable acrylic syrup pressure sensitive adhesive composition comprising:

A4) at least 35 wt.-%, preferably at least 50 wt.-%, of the at least acrylic monomer AM, B4) 0-30 wt.-%, preferably 5-20 wt.-%, of the at least one tackifying resin TR, C4) 0-5 wt.-%, preferably 0.01-1 wt.-%, of the at least one cross-linking agent CA, and D4) 0.1-5 wt.-%, preferably 0.25-2.5 wt.-%, of the at least one photoinitiator PI, all proportions being based on the total weight of the UV-curable acrylic syrup pressure sensitive adhesive composition.

According to one or more further embodiments, the UV-curable acrylic pressure sensitive adhesive composition is an UV-curable acrylic syrup pressure sensitive adhesive composition comprising:

A51) at least 35 wt.-%, preferably at least 50 wt.-%, more preferably at least 55 wt.-%, even more preferably at least 65 wt.-%, of at least one acrylic compound A, A52) 1.5-55 wt.-%, preferably 2.5-45 wt.-%, more preferably 5-40 wt.-%, even more preferably 7.5-35 wt.-%, of a reaction product RP obtained by polyaddition reaction of at least one compound P with at least one hardener H, B5) 0-30 wt.-%, preferably 5-20 wt.-%, of the at least one tackifying resin TR, C5) 0-5 wt.-%, preferably 0.01-1 wt.-%, of the at least one cross-linking agent CA, and D6) 0.1-5 wt.-%, preferably 0.25-2.5 wt.-%, of the at least one photoinitiator PI, all proportions being based on the total weight of the UV-curable acrylic syrup pressure sensitive adhesive.

Examples of suitable acrylic compounds A for use in the UV-curable acrylic syrup pressure sensitive adhesive include acrylic monomers, such as (meth)acrylates, alkyl (meth)acrylates, di(meth)acrylates, and derivatives thereof, for example, amides and nitriles of (meth)acrylates. Further suitable acrylic compounds A include (meth)acryl-functional polymers, such as (meth)acrylate, polyurethane, polyether/polyoxyalkylene, and polyester polymers containing one or more (meth)acryl groups. The (meth)acryl groups of an (meth)acryl-functional polymer may be in pendant positions in the polymer chain or in terminal positions.

According to one or more embodiments, the at least one acrylic compound A contains exactly one acryl group.

Preferably, the at least one acrylic compound A has a weight average molecular weight ($M_w$) determined by gel permeation chromatography (GPC) using polystyrene as standard of not more than 25000 g/mol, more preferably not more than 15000 g/mol, even more preferably not more than 10000 g/mol.

According to one or more embodiments, the at least one acrylic compound A has a weight average molecular weight ($M_w$) determined by gel permeation chromatography (GPC) using polystyrene as standard in the range of 100-15000 g/mol, preferably 125-10000 g/mol, more preferably 125-7500 g/mol, even more preferably 125-5000 g/mol and/or a viscosity at 20° C. determined according to ISO 3219:1994 standard in the range of 250-25000 mPa·s, preferably 500-20000 mPa·s, more preferably 1000-15000 mPa·s, even more preferably 1500-15000 mPa·s.

As used in the present disclosure, the term "polyaddition reaction" refers to a reaction in which new bonds are formed by undergoing an addition reaction among functional groups of the compound having a functional group and the aforesaid reaction is successively repeated to form a polymer. Consequently, the at least one compound P contains first type of functional group(s) that that react with second type of functional group(s) contained in the at least one hardener H in the polyaddition reaction.

According to one or more embodiments, the at least one compound P contains isocyanate groups, i.e., the first type of functional groups of the at least one compound P are isocyanate groups and the at least one hardener contains isocyanate-reactive groups, i.e., the second type of functional groups of the at least one hardener H are isocyanate-reactive groups.

According to one or more embodiments, the polyaddition reaction between the at least one compound P and the at least one hardener H is conducted at a molar ratio of the isocyanate groups to the isocyanate-reactive groups of 0.95-1.5, preferably 0.97-1.2, more preferably 0.97-1.1, even more preferably 0.97-1.05.

According to one or more embodiments, the first adhesive layer (3) has a thickness 10-250 μm, preferably 35-200 μm, more preferably 50-150 μm. Such thicknesses of adhesive layer have been found out to provide sufficiently high interlayer peel strengths between the waterproofing layer and the barrier layer.

The barrier layer (4) is preferably bonded to at least a portion of the second major surface of the waterproofing layer (2) via the first adhesive layer (3).

Suitable polyamides to be used as the at least one polymer P2 contained in the polymeric layer of the barrier layer include aromatic and aliphatic crystalline and semi-crystalline polyamides. Amorphous polyamides are generally not preferred. The term "amorphous polyamide" refers here to polyamides that lack a crystalline melting point ($T_m$) as determined by differential scanning calorimetric (DSC) or an equivalent technique. Amorphous polyamides are distinct from the crystalline or semi-crystalline polyamides, such as Nylon 6 and Nylon 12.

Suitable polyamides include, for example, homo polyamides, such as Nylon 6 (PA6), which is synthetized by ring-opening polymerization of caprolactam; Nylon 6-6 (PA66), which is synthesized by polycondensation of hexamethylenediamine and adipic acid; and Nylon 12 (PA12), which can be synthetized either by polycondensation of ω-aminolauric acid or by ring-opening polymerization of laurolactam. Bioplastic polyamides, such as Nylon 11, which is synthetized by polymerization of 11-aminoundecanoic acid, are also suitable. Further suitable are aliphatic and aromatic copolyamides, such as copolymers of PA6 and isophorone diisocyanate (IPDI).

Suitable polyamides are commercially available, for example, under the trade name of Grivory® (from EMS Chemie), such as Grivory® G16 and G21, which are copolyamides having both linear aliphatic units and ring-like aromatic components; under the trade name of Versamid® (from Gabriel Performance Products), such as Versamid® 100, which is an aliphatic polyamide; under the trade name of Rilsan (from Arkema), such as Rilsan® TMNO TLD, Rilsan® BMNO TLD, and Rilsamid® AMNO TLD; under the trade name of Vestamid® (from Evonik); and under the trade name of ® Durethan (from Lanxess), such as Durethan C 38F.

The term "ethylene vinyl alcohol (EVOH)" refers in the present disclosure to copolymers of vinyl alcohol and ethylene. Suitable ethylene vinyl alcohols can be obtained, for example, by hydrolyzation of ethylene vinyl acetate copolymers or by chemical reaction of ethylene monomers with vinyl alcohol.

Suitable ethylene vinyl alcohols to be used as the at least one polymer P2 have:

a molar content of ethylene comonomers in the range of 10-75 mol.-%, preferably 15

65 mol.-% and/or a hydrolyzation degree of at least 35%, preferably at least 50%, more preferably at least 75%, in case the ethylene vinyl alcohol has been obtained by hydrolyzation of ethylene vinyl acetate copolymers.

Suitable ethylene vinyl alcohols are commercially available, for example, under the trade names of Soarnol® (from Mitsubishi Chemicals) and Eval® (from Kuraray).

Suitable polyesters for use as the at least one polymer P2 include, for example, poly(ethylene terephthalate) (PET) and poly(butylene terephthalate) (PBT).

Especially suitable poly(ethylene terephthalate) s to be used as the at least one polymer P2 have:

a high content of ethylene terephthalate units, such as at least 90 wt.-%, preferably at least 95 wt.-%, more preferably at least 97.5 wt.-%, based on the weight of the poly(ethylene terephthalate) and/or a low content of dioxyethylene terephthalate units, such as not more than 10 wt.-%, preferably not more than 5 wt.-%, more preferably not more than 2.5 wt.-%, based on the weight of the poly(ethylene terephthalate) and/or a melting temperature ($T_m$) determined by differential scanning calorimetry (DSC) according to ISO 11357-3 standard using a heating rate of 2° C./min of at or above 200° C., preferably at or above 225° C., more preferably at or above 250° C.

Suitable poly(ethylene terephthalate) s are commercially available, for example, under the trade name of Vituf® (from Goodyear Chemical Company); under the trade name of Impet® (from Celanese), and under the trade name of Mylar® (from Dupont).

Preferably, the polymeric film (4-1) comprises the at least one polymer P2 in an amount of at least 35 wt.-%, more preferably at least 50 wt.-%, even more preferably at least 75 wt.-%, still more preferably at least 85 wt.-%, based on the total weight of the polymeric film (4-1).

The thickness of the barrier layer (4) is preferably at least 15 μm, more preferably at least 20 μm, even more preferably at least 25 μm, and not more than 150 μm, particularly not more than 100 μm.

According to one or more embodiments, the barrier layer (4) has a thickness of 15-150 μm, preferably 25-125 μm, more preferably 30-100 μm, even more preferably 35-85 μm. Barrier layers having a thickness falling within the above cited ranges have been found out to exhibit good isolation properties without significantly increasing the production costs of the membrane.

According to one or more embodiments, the at least one polymer P2 is selected from polyethylene terephthalate and polyamide, preferably polyethylene terephthalate, and the polymeric film (4-1) comprises the at least one polymer P2 in an amount of at least 50 wt.-%, more preferably at least 75 wt.-%, even more preferably at least 85 wt.-%, based on the total weight of the polymeric film (4-1).

Barrier layers comprising a polymeric film having polyethylene terephthalate or polyamide as the polymer P2 have been found out to have exceptionally good barrier properties against the migration of volatile compounds.

Figure 1:
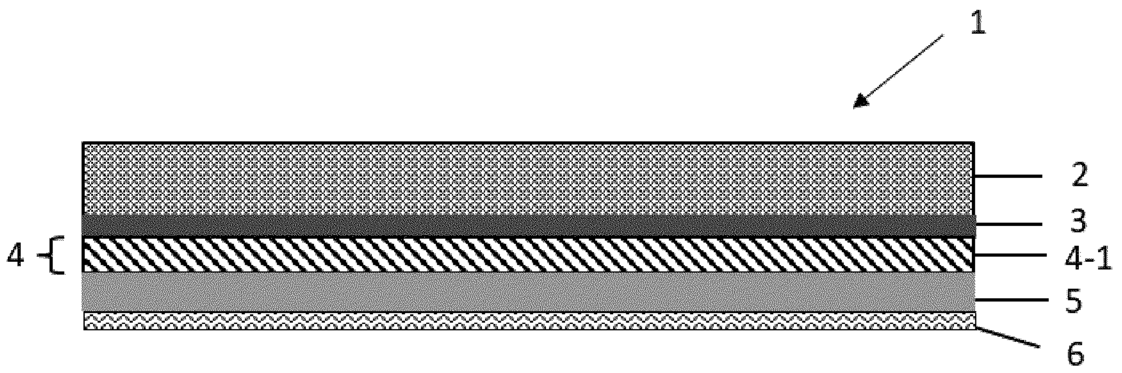

According to one or more embodiments, the barrier layer (4) is composed of the polymeric film (4-1), as shown in FIG. 1.

According to one or more embodiments, the barrier layer (4) is composed of the polymeric film (4-1), wherein the at least one polymer P2 is selected from polyethylene terephthalate (PET) and polyamide, preferably polyethylene terephthalate, and the polymeric film (4-1) comprises the at least one polymer P2 in an amount of at least at least 50 wt.-%, more preferably at least 75 wt.-%, even more preferably at least 85 wt.-%, based on the total weight of the polymeric film (4-1).

According to one or more embodiments, the barrier layer (4) further comprises a protective polymeric film (4-2) comprising at least one polymer P3 and/or a metallic film (4-3). The protective polymeric film and/or the metallic film may be used to improve the mechanical properties and/or barrier properties of the barrier film.

Preferably, the at least one polymer P3 is selected from the group consisting of polyethylene and ethylene copolymers.

Suitable polyethylenes for use as the at least one polymer P3 include very-low-density polyethylene, low-density polyethylene, linear low-density polyethylene, medium-density polyethylene, high-density polyethylene, and ultra-high-molecular-weight polyethylene, particularly low-density polyethylene, linear low-density polyethylene, medium-density polyethylene, high-density polyethylene.

Suitable ethylene copolymers for use as the at least one polymer P3 include random and block copolymers of ethylene and one or more $C_3$-$C_{20}$ α-olefin monomers, particularly one or more of propylene, 1-butene, 1-pentene, 1-hexene, 1-heptene, 1-octene, 1-decene, 1-dodecene, and 1-hexadodecene, preferably comprising at least 60 wt.-%, more preferably at least 65 wt.-% of ethylene-derived units, based on the weight of the copolymer.

Preferably, the protective polymeric film (4-2) comprises the at least one polymer P3 in an amount of at least at least 35 wt.-%, more preferably at least 50 wt.-%, even more preferably at least 75 wt.-%, still more preferably at least 85 wt.-%, based on the total weight of the protective polymeric film (4-2).

According to one or more embodiments, the at least one polymer P3 is polyethylene, preferably selected from low-density polyethylene, linear low-density polyethylene, medium-density polyethylene, high-density polyethylene.

The thickness of the protective polymeric film (4-2) is preferably not more than 100 μm, more preferably not more than 75 μm. According to one or more embodiments, the protective polymeric film (4-2) has a thickness of 2.5-100 μm, preferably 5-75 μm, more preferably 10-55 μm, even more preferably 10-35 μm.

According to one or more embodiments, the metallic film (4-3) is an aluminum or aluminum alloy film, preferably an aluminum film.

The thickness of the metallic film (4-3) is preferably not more than 75 μm, more preferably not more than 50 μm, even more preferably not more than 35 μm. According to one or more embodiments, the metallic film (4-3) has a thickness of 1-50 μm, preferably 1.5-35 μm, more preferably 2.5-30 μm, even more preferably 2.5-25 μm.

Figure 3:
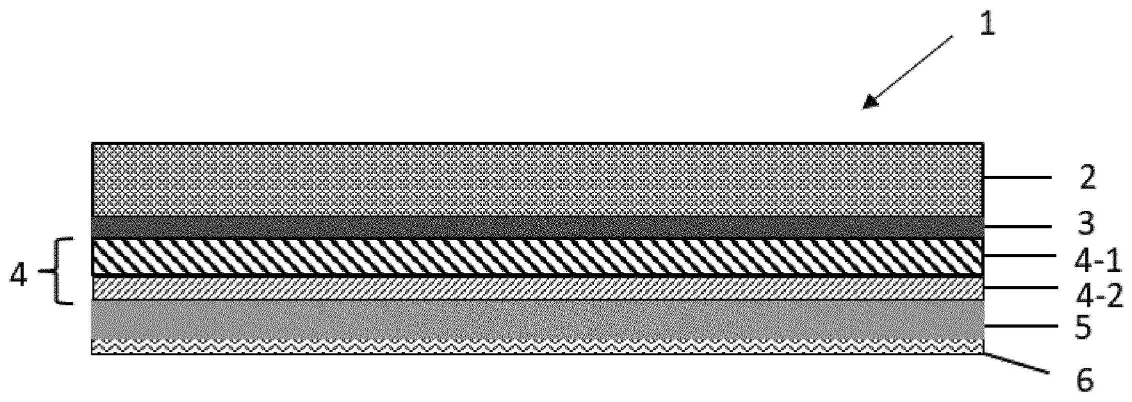
FIG. 3 shows a cross-section of a self-adhering roofing membrane (1) comprising a waterproofing layer (2), a first adhesive layer (3), a barrier layer (4) comprising a polymeric film (4-1) and a protective polymeric film (4-2), a second adhesive layer (5), and a release liner (6) covering the outer major surface of the second adhesive layer (5) facing away from the barrier layer (4).

According to one or more embodiments, the barrier layer (4) comprises or is composed of the polymeric film (4-1) and the protective polymeric film (4-2), which are directly or indirectly connected, preferably directly connected, to each other over at least a portion of their opposing major surfaces, as shown in FIG. 3.

The expression "directly connected" is understood to mean in the context of the present disclosure that no further layer or substance is present between the two layers and that the opposing surfaces of the two layers are directly bonded to each other or adhere to each other. At the transition area between the two layers, the materials forming the layers can also be present mixed with each other. The expression "indirectly connected" is understood to mean that the layers are connected to each other via a connecting layer, such an adhesive layer.

Figure 4:
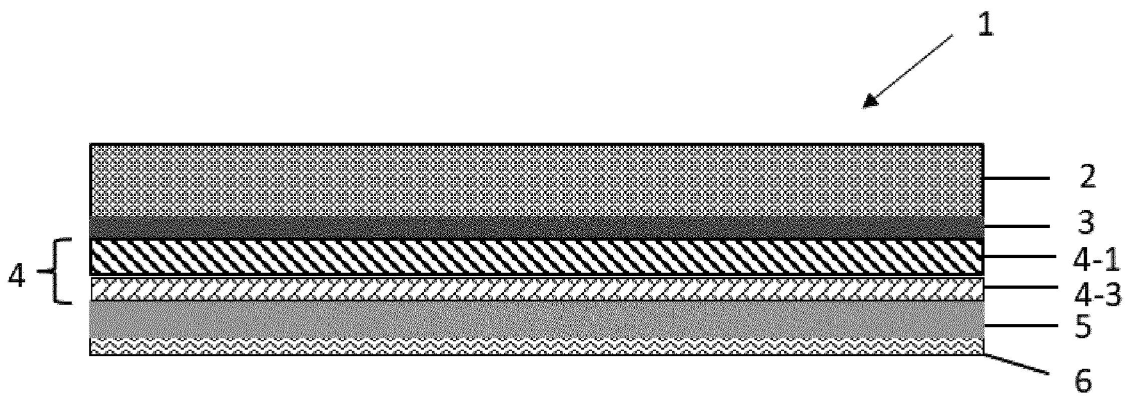
FIG. 4 shows a cross-section of a self-adhering roofing membrane (1) comprising a waterproofing layer (2), a first adhesive layer (3), a barrier layer (4) composed of a polymeric film (4-1) and a metallic film (4-3), a second adhesive layer (5), and a release liner (6) covering the outer major surface of the second adhesive layer (5) facing away from the barrier layer (4).

According to one or more further embodiments, the barrier layer (4) comprises or is composed of the polymeric film (4-1) and the metallic film (4-3), which are directly or indirectly connected to each other over at least a portion of their opposing major surfaces, as shown in FIG. 4.

According to one or more embodiments, the metallic film (4-3) has been adhesively laminated to at least portion of a lower major surface of the polymeric film (4-1).

The term "adhesive lamination" refers to a process in which the respective layers are bonded to each by using an adhesive composition. Suitable adhesives for use in bonding of the metallic film to the polymeric film include, for example, one-component and two-component polyurethane and epoxide adhesives, non-reactive and reactive hot-melt adhesives, and acrylic adhesives.

The self-adhering roofing membrane further comprises a second adhesive layer (5) that is a pressure sensitive adhesive layer.

Preferably, the second adhesive layer (5) covers at least a portion of an outer major surface of the barrier layer (4) facing away from the first adhesive layer (3).

According to one or more preferred embodiments, the second adhesive layer (5) covers at least 50%, more preferably at least 65%, most preferably at least 75% of the area of the outer major surface of the barrier layer (4) facing away from the first adhesive layer (3). According to one or more embodiments, the second adhesive layer (5) covers substantially the entire area of the outer major surface of the barrier layer (4) facing away from the first adhesive layer (3). The term "substantially entire area" is understood to mean at least 85%, preferably at least 90%, more preferably at least 92%, most preferably at least 95%, of the area of the outer major surface of the barrier layer (5).

Furthermore, it may also be preferable, for example due to production technical reasons, that narrow segments on the outer major surface of the barrier layer (5) near the longitudinal edges and having a width of 1-2 mm are left free of the second adhesive layer (5).

Preferably, the second adhesive layer is a continuous adhesive layer. The term "continuous layer" refers in the present disclosure to a layer consisting of one single area coated with the adhesive whereas a "discontinuous layer" is considered to consist of several isolated areas coated with the adhesive.

According to one or more embodiments, the second adhesive layer (5) has a thickness of 0.15-1 mm, preferably 0.25-0.75 mm, more preferably 0.3-0.7 mm, even more preferably 0.35-0.65 mm.

Suitable pressure sensitive adhesives for use in the second adhesive layer (5) include acrylic adhesives and synthetic rubber-, natural rubber-, and bitumen-based adhesives.

According to one or more embodiments, the second adhesive layer (5) is selected from the group consisting of acrylic polymer-, styrene-block copolymer-, butyl rubber-, and bitumen-based pressure sensitive adhesive layers, preferably from the group consisting of acrylic polymer-, butyl rubber-, and bitumen-based pressure sensitive adhesive layers, more preferably from the group consisting of butyl rubber- and bitumen-based pressure sensitive adhesive layers.

According to one or more embodiments, the second adhesive layer (5) is a dried layer of a water- or solvent-based acrylic pressure sensitive adhesive composition or a cured layer of a UV- or electron beam curable acrylic pressure sensitive adhesive composition.

The water- or solvent-based acrylic pressure sensitive adhesive compositions and UV- or electron beam curable acrylic pressure sensitive adhesive compositions discussed above as suitable for the first adhesive layer (3) are also suitable for use in the second adhesive layer (5).

According to one or more further embodiments, the second adhesive layer is a layer of a styrene copolymer-based pressure sensitive adhesive composition comprising:

- 15-75 wt.-%, preferably 25-65 wt.-%, more preferably 35-60 wt.-%, of at least one styrene block copolymer SC,
- 2.5-85 wt.-%, preferably 5-75 wt.-%, more preferably 10-65 wt.-%, of at the least one tackifying resin TR,
- 0-35 wt.-%, preferably 2.5-25 wt.-%, more preferably 5-15 wt.-%, of the at least one filler F,
- 0-30 wt.-%, preferably 2.5-25 wt.-%, more preferably 5-15 wt.-%, of at least one plasticizer PL, all proportions being based on the total weight of the styrene copolymer-based pressure sensitive adhesive composition.

Suitable styrene block copolymers for use as the at least one styrene block copolymer SC include styrene block copolymers of the SXS type, in each of which S denotes a non-elastomer styrene (or polystyrene) block and X denotes an elastomeric α-olefin block, which may be polybutadiene, polyisoprene, polyisoprene-polybutadiene, completely or partially hydrogenated polyisoprene (poly ethylene-propylene), or completely or partially hydrogenated polybutadiene (poly ethylene-butylene). The elastomeric α-olefin block preferably has a glass transition temperature in the range from −55° C. to −35° C. The elastomeric α-olefin block may also be a chemically modified α-olefin block. Particularly suitable chemically modified α-olefin blocks include, for example, maleic acid-grafted α-olefin blocks and particularly maleic acid-grafted ethylene-butylene blocks.

According to one or more embodiments, the at least one styrene block copolymer SC is selected from the group consisting of styrene-butadiene-styrene (SBS), styrene-isoprene-styrene (SIS), styrene-isoprene-butadiene-styrene (SIBS), styrene-ethylene-butadiene-styrene (SEBS), and styrene-ethylene-propene-styrene (SEPS) block copolymers.

Suitable compounds to be used as the at least one plasticizer PL are liquid plasticizers. The term "liquid" is generally defined as a material that flows at normal room temperature, has a pour point of less than 20° C. and/or a kinematic viscosity at 25° C. of 50000 cSt or less.

According to one or more embodiments, the at least one plasticizer PL is selected from the group consisting of mineral oils, synthetic oils, vegetable oils, and at 25° C. liquid hydrocarbon resins.

Suitable at 25° C. liquid hydrocarbon resins for use as the plasticizer PL include at 25° C. liquid polybutenes and at 25° C. liquid polyisobutylenes (PIB). The term "at 25° C. liquid polybutene" designates in the present disclosure low molecular weight olefin oligomers comprising isobutylene and/or 1-butene and/or 2-butene. The ratio of the $C_4$-olefin isomers can vary by manufacturer and by grade. When the C4-olefin is exclusively 1-butene, the material is referred to as "poly-n-butene" or "PNB". The term "at 25° C. liquid polyisobutylene" designates in the present disclosure low molecular weight polyolefins and olefin oligomers of isobutylene, preferably containing at least 75%, more preferably at least 85% of repeat units derived from isobutylene. Particularly suitable at 25° C. liquid polybutenes and polyisobutylenes have a molecular weight ($M_n$) of not more than 10000 g/mol, preferably not more than 5000 g/mol, more preferably not more than 3500 g/mol, even more preferably not more than 3000 g/mol, still more preferably not more than 2500 g/mol.

Liquid polybutenes are commercially available, for example, under the trade name of Indopol® H- and L-series (from Ineos Oligomers), under the trade name of Infineum® C-series and Parapol® series (from Infineum), and under the trade name of PB-series (Daelim). Liquid polyisobutylenes (PIBs) are commercially available, for example, under the trade name of Glissopal® V-series (from BASF) and and under the trade name of Dynapak®-series (from Univar GmbH, Germany).

According to one or more further embodiments, the second adhesive layer (5) is a layer of bitumen-based pressure sensitive adhesive composition comprising:

15-90 wt.-%, preferably 25-85 wt.-%, more preferably 35-75 wt.-%, even more preferably 40-70 wt.-%, of bitumen B and 5-35 wt.-%, preferably 10-30 wt.-%, more preferably 15-30 wt.-%, even more preferably 20-30 wt.-%, of at least one modifying polymer MP, 2.5-30 wt.-%, preferably 5-25 wt.-%, of the at least one tackifying resin TR and/or 2.5-30 wt.-%, preferably 5-25 wt.-%, of the at least one filler F, and/or 0.5-15 wt.-%, preferably 2.5-10 wt.-%, of the at least one plasticizer PL, all proportions being based on the total weight of the bitumen-based pressure sensitive adhesive composition.

The term "bitumen" designates in the present disclosure blends of heavy hydrocarbons, having a solid consistency at room temperature, which are normally obtained as vacuum residue from refinery processes, which can be distillation (topping or vacuum) and conversion (thermal cracking and visbreaking) processes of suitable crude oils. Furthermore, the term "bitumen" also designates natural and synthetic bitumen as well as bituminous materials obtained from the extraction of tars and bituminous sands.

The bitumen B can comprise one of more different types of bitumen materials, such as penetration grade (distillation) bitumen, air-rectified (semi-blown) bitumen, and hard grade bitumen.

The term "penetration grade bitumen" refers here to bitumen obtained from fractional distillation of crude oil. A heavy fraction composed of high molecular weight hydrocarbons, also known as long residue, which is obtained after removal of gasoline, kerosene, and gas oil fractions, is first distilled in a vacuum distillation column to produce more gas oil, distillates, and a short residue. The short residue is then used as a feed stock for producing different grades of bitumen classified by their penetration index, typically defined by a PEN value, which is the distance in tenth millimeters (dmm) that a needle penetrates the bitumen under a standard test method. Penetration grade bitumen are characterized by penetration and softening point. The term "air-rectified bitumen" or "air-refined bitumen" refers in the present disclosure to a bitumen that has been subjected to mild oxidation with the goal of producing a bitumen that meets paving-grade bitumen specifications. The term "hard grade bitumen" refers in the present disclosure to bitumen produced using extended vacuum distillation with some air rectification from propane-precipitated bitumen. Hard bitumen typically has low penetration values and high softening-points.

According to one or more embodiments, the bitumen B comprises at least 75 wt.-%, preferably at least 85 wt.-%, more preferably at least 90 wt.-% of at least one penetration grade bitumen, preferably having a penetration value in the range of 30-300 dmm, more preferably 70-220 dmm, even more preferably 100-160 and/or a softening point determined by Ring and Ball measurement conducted according to DIN EN 1238 standard in the range of 30-100° C., more preferably 30-70° C., even more preferably 30-50° C.

Suitable compounds for use as the modifying polymer MP include, for example, polyolefins, such as atactic polypropylene (APP), amorphous polyolefins (APO), styrene block copolymers, and rubbers.

The term "amorphous polyolefin (APO)" refers in the present disclosure to polyolefins having a low crystallinity degree determined by a differential scanning calorimetry (DSC) measurement, such as in the range of 0.001-10 wt.-%, preferably 0.001-5 wt.-%. The crystallinity degree of a polymer can be determined by using the differential scanning calorimetry measurements conducted according to ISO 11357 standard to determine the heat of fusion, from which the degree of crystallinity is calculated. In particular, the term "amorphous polyolefin" designates poly-α-olefins lacking a crystalline melting point ($T_m$) as determined by differential scanning calorimetric (DSC) or equivalent technique.

Suitable amorphous polyolefins for use as the modifying polymer MP include, for example, amorphous propene rich copolymers of propylene and ethylene, amorphous propene rich copolymers of propylene and butene, amorphous propene rich copolymers of propylene and hexene, and amorphous propene rich terpolymers of propylene, ethylene, and butene. The term "propene rich" is understood to mean copolymers and terpolymers having a content of propene derived units of at least 50 wt.-%, preferably at least 65 wt.-%, more preferably at least 70 wt.-%, based on total weight of the copolymer/terpolymer.

Preferred styrene block copolymers for use as the modifying polymer MP include, for example, styrene-butadiene-styrene (SBS), styrene-isoprene-styrene (SIS), styrene-isoprene-butadiene-styrene (SIBS), styrene-ethylene-butadiene-styrene (SEBS), and styrene-ethylene-propene-styrene (SEPS) block copolymers, preferably having a linear, radial, diblock, triblock or a star structure.

Suitable rubbers for use as the modifying polymer MP include, for example, styrene-butadiene rubber (SBR), ethylene propylene diene monomer (EPDM), polyisoprene, polybutadiene, natural rubber, polychloroprene rubber, ethylene-propylene rubber (EPR), nitrile rubbers, and acrylic rubbers.

According to one or more embodiments, the at least one modifying polymer MP is selected from the group consisting of atactic polypropylene (APP), amorphous polyolefins (APO), styrene-butadiene-styrene (SBS) block copolymer, styrene-isoprene-styrene (SIS) block copolymer, styrene-butadiene rubber (SBR), ethylene propylene diene monomer (EPDM), polyisoprene, polybutadiene, natural rubber, polychloroprene rubber, ethylene-propylene rubber (EPR), nitrile rubbers, and acrylic rubbers, preferably from the group consisting of atactic polypropylene (APP), amorphous polyolefins (APO), styrene-butadiene-styrene (SBS) block copolymer, styrene-isoprene-styrene (SIS) block copolymer, and styrene-butadiene rubber (SBR).

According to one or more further embodiments, the second adhesive layer (5) is a layer of butyl rubber-based pressure sensitive adhesive composition comprising:

15-90 wt.-%, preferably 25-85 wt.-%, more preferably 35-75 wt.-%, even more preferably 40-70 wt.-%, of at 25° C. solid butyl rubber BR1, 5-35 wt.-%, preferably 10-30 wt.-%, more preferably 15-30 wt.-%, even more preferably 20-30 wt.-%, of the at least one at 25° C. liquid butyl rubber BR2, 1.5-30 wt.-%, preferably 2.5-25 wt.-%, of the at least one tackifying resin TR and/or 1.5-30 wt.-%, preferably 2.5-25 wt.-%, of the at least one filler F, and/or 0.5-15 wt.-%, preferably 1.5-10 wt.-%, of the at least one plasticizer PL, all proportions being based on the total weight of the butyl rubber-based pressure sensitive adhesive composition.

According to one or more embodiments, the self-adhering roofing membrane further comprises a release liner (6) covering at least portion of the outer major surface of the second adhesive layer (5) facing away from the barrier layer (4).

Preferably, the second adhesive layer and the release liner are directly connected to each other over at least portion of their opposing major surfaces. The release liner may be used to prevent premature unwanted adhesion and to protect the adhesive layer from moisture, fouling, and other environmental factors. In case the roofing membrane is provided in form of rolls, the release liner enables ease of unwind without sticking of the adhesive to the back side of the roofing membrane. The release liner may be sliced into multiple sections to allow portioned detachment of the liner from the adhesive layer.

Suitable materials for the release liner include Kraft paper, polyethylene coated paper, silicone coated paper as well as polymeric films, for example, polyethylene, polypropylene, and polyester films coated with polymeric release agents selected from silicone, silicone urea, urethanes, waxes, and long chain alkyl acrylate release agents.

The self-adhering roofing membrane of the present invention may be a single- or a multi-ply roofing membrane. The term "single-ply roofing membrane" designates in the present document membranes comprising one single waterproofing layer whereas the term "multi-ply roofing membrane" designates membranes comprising more than one waterproofing layers. In case of a multi-ply roofing membrane, the waterproofing layers may have similar or different compositions.

Single- and multi-ply membranes are known to a person skilled in the art and they may be produced by any conventional means, such as by way of extrusion or co-extrusion, calendaring, or by spread coating. According to one or more embodiments, the self-adhering roofing membrane is a single-ply membrane comprising exactly one waterproofing layer.

According to one or more further embodiments, the self-adhering roofing membrane is a multi-ply membrane comprising at least two waterproofing layers, preferably exactly two waterproofing layers. In these embodiments, the self-adhering roofing membrane further comprises a second waterproofing layer having first and second major surfaces, wherein the second major surface of the second waterproofing layer is directly or indirectly bonded to at least portion of the first major surface of the waterproofing layer.

According to one or more embodiments, the second waterproofing layer has substantially identical composition as the waterproofing layer.

Preferably, the self-adhering roofing membrane has a 90° peel resistance from stainless steel, measured by using the method as defined in EN DIN 1372 standard, of at least 5 N/50 mm, more preferably at least 10 N/50 mm, most preferably at least 15 N/50 mm.

Such peel strengths have been found out to be obtained with the second adhesive layer as defined above.

The self-adhering roofing membrane of the present invention is typically provided in a form of a prefabricated membrane article, which is delivered to the construction site and unwound from rolls to provide sheets having a width of 1-5 m and length of several times the width. However, narrow strips cut from the self-adhering roofing membrane having a width of 5-50 cm, particularly 10-45 cm, can also be used, for example, to seal joints between two adjacent membranes. Moreover, the self-adhering roofing membrane can also be provided in the form of planar bodies, which are used for repairing damaged locations in existing waterproofing or roofing systems.

The preferences given above for the waterproofing layer(s), the first and second adhesive layer, the barrier layer, and to the release liner apply equally to all aspects of the present invention unless otherwise stated.

Another aspect of the present invention is fully-adhered roof system comprising a roof substrate (8) and a self-adhering roofing membrane (1) according to the present invention directly adhered to a surface of the roof substrate (8) via the second adhesive layer (5).

The expression "directly adhered" is understood to mean that there are no further layers present between the second adhesive layer (5) and the roof substrate (8).

According to one or more embodiments, the roof substrate (8) is selected from the group consisting of bitumen, concrete, ceramic, fiber concrete, metal, glass, thermoplastic polymer, rubber, and plywood substrates, preferably from the group consisting of bitumen, concrete, and ceramic substrates.

The term "bitumen substrate" designates substrates comprising a significant amount of bitumen, preferably at least 15 wt.-%, more preferably at least 35 wt.-%, of bitumen, based on the total weight of the substrate.

Figure 5:
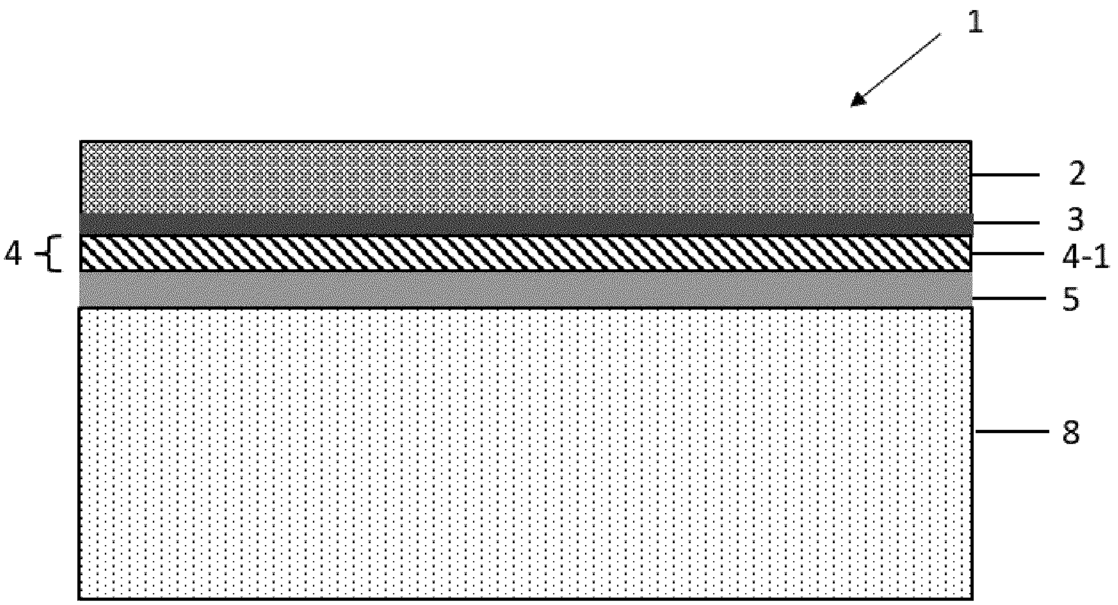
FIG. 5 shows a cross-section of a fully-adhered roof system comprising a roof substrate (8) and a self-adhering roofing membrane (1) of FIG. 1 after removal of the release liner (6), wherein the self-adhering roofing membrane (1) is directly adhered to a surface of the roof substrate (8) via the second adhesive layer (5).

According to one or more embodiments at least 50%, preferably at least 75%, most preferably at least 85% of the area of the outer major surface of the barrier layer (4) facing away from the first adhesive layer (3) is directly adhered to the surface of the roof substrate (8) via the second adhesive layer (5). According to one or more embodiments, substantially the entire area of the outer major surface of the barrier layer (4) facing away from the first adhesive layer (3) is directly adhered to the surface of the roof substrate (8) via the second adhesive layer (5), as shown in FIG. 5.

Another aspect of the present invention is a method for producing a self-adhering roofing membrane (1) of the present invention, the method comprising steps of:

I) Providing a waterproofing layer (2) and a barrier layer (4) having first and second major surfaces, II) Providing a first adhesive layer (3) on the second major surface of the waterproofing layer (2) or on one of the major surfaces of the barrier layer (4) and bonding the barrier layer (4) to the waterproofing layer via the first adhesive layer (3), III) Providing a second adhesive layer (5) on an outer major surface of the barrier layer (4) facing away from the first adhesive layer (3), and IV) Optionally covering an outer major surface of the second adhesive layer (5) facing away from the barrier layer (4) with a release liner (5).

Still another aspect of the present invention is a method for waterproofing a roof substrate (8), the method comprising steps of:

I. Providing a self-adhering roofing membrane (1) according to the present invention, II. Applying the self-adhering roofing membrane (1) onto a surface of the roof substrate (8) such that at least a portion of the outer major surface of the second adhesive layer (5) facing away from the barrier layer (4) is directly connected to the surface of the roof substrate (8), and III. Pressing the self-adhering roofing membrane (1) against the surface of the roof substrate (8) with a pressure sufficient to affect adhesive bonding between the waterproofing layer (2) and the surface of the roof substrate (8).

According to one or more embodiments, the roof substrate (8) is selected from the group consisting of bitumen, concrete, ceramic, fiber concrete, metal, glass, thermoplastic polymer, rubber, and plywood substrates, preferably from the group consisting of bitumen, concrete, and ceramic substrates.

Still another aspect of the present invention is a kit-of-parts comprising:

i. A double-sided self-adhering barrier layer (9) comprising a barrier layer (4), a first adhesive layer (3) covering at least a portion of an upper major surface of the barrier layer (4), a second adhesive layer (5) covering at least a portion of the lower major surface of the barrier layer (4) and ii. A roofing membrane (10) comprising a waterproofing layer (2) comprising at least one polymer P1, wherein the double-sided self-adhering barrier layer (9) further comprises a first release liner (11) covering at least a portion of the outer major surface of the first adhesive layer (3) facing away from the barrier layer (4) and a second release liner (12) covering at least a portion of the outer major surface of the second adhesive layer (5) facing away from the barrier layer (4), or i.' A single-sided self-adhering barrier layer (13) comprising a barrier layer (4), a second adhesive layer (5) covering at least a portion of a lower major surface of the barrier layer (4) and ii.' A single-sided self-adhering roofing membrane (14) comprising a waterproofing layer (2) comprising at least one polymer P1 and a first adhesive layer (3) covering at least a portion of a lower major surface of the waterproofing layer (2), wherein the single-sided self-adhering barrier layer (13) further comprises a second release liner (12) covering at least a portion of the outer major surface of the second adhesive layer (5) facing away from the barrier layer (4) and wherein the single-sided self-adhering roofing membrane (14) further comprises a first release liner (11) covering at least a portion of the outer major surface of the first adhesive layer (3) facing away from the waterproofing layer (2).

Kit-of-parts according to the first and second alternative embodiments are shown in FIGS. 7 and 8, respectively.

The preferred embodiments of the barrier layer, the waterproofing layer, the first and second adhesive layers, and the release liner have already been discussed above.

Still another aspect of the present invention is a method for sealing a roof substrate (8), characterized in that the method comprises steps of:

A. Providing a kit-of-parts according to the present invention,

B. Removing the second release liner (12) and applying the double-sided self-adhering barrier layer (9) onto a surface of the roof substrate (8) such that at least a portion of the outer major surface of the second adhesive layer (5) is directly connected to the surface of the roof substrate (8), C. Pressing the double-sided self-adhering barrier layer (9) against the surface of the roof substrate (8) with a pressure sufficient to affect adhesive bonding between the barrier layer (4) and the surface of the roof substrate (8), D. Positioning the roofing membrane (10) to cover at least a portion of the double-sided self-adhering barrier layer (9), E. Lifting a first portion of the roofing membrane (10) and removing a portion of the first release liner (11) covering a first portion of the first adhesive layer (3), F. Contacting the first portion of the roofing membrane (10) with the first portion of the first adhesive layer (3), G. Lifting a second portion of the roofing membrane (10) and removing a portion of the first release liner (11) covering a second portion of the first adhesive layer (3), H. Contacting the second portion of the roofing membrane (10) with the second portion of the first adhesive layer (3), and I. Pressing the first and second portions of the roofing membrane against the surface of the roof substrate (8) with a pressure sufficient to affect adhesive bonding between the roofing membrane (10) and the barrier layer (4)

or

A.' Providing a kit-of-parts according to the present invention,

B.' Removing the second release liner (12) and applying the single-sided self-adhering barrier layer (13) onto a surface of the roof substrate (8) such that at least a portion of the outer major surface of the second adhesive layer (5) is directly connected to the surface of the roof substrate (8), C.' Pressing the single-sided self-adhering barrier layer (13) against the surface of the roof substrate (8) with a pressure sufficient to affect adhesive bonding between the barrier layer (4) and the surface of the roof substrate (8), D.' Positioning the single-sided self-adhering roofing membrane (14) to cover at least a portion of the single-sided self-adhering barrier layer (13), E.' Lifting a first portion of the single-sided self-adhering roofing membrane (14) and removing a portion of the first release liner (11) covering a first portion of the first adhesive layer (3), F.' Contacting the first portion of the first adhesive layer (3) with a first portion of the barrier layer (4), G.' Lifting a second portion of the single-sided self-adhering roofing membrane (14) and removing a portion of the first release liner (11) covering a second portion of the first adhesive layer (5), H.' Contacting the second portion of the first adhesive layer (3) with a second portion of the barrier layer (4), and I.' Pressing the first and second portions of the single-sided self-adhering roofing membrane (14) against the surface of the roof substrate (8) with a pressure sufficient to affect adhesive bonding between the waterproofing layer (2) and the barrier layer (4).

FIGS. 9.1 to 9.4 show a schematic presentation of the method for sealing a roof substrate (8) using the kit-of-parts according to the first alternative embodiment shown in FIG. 7.

FIG. 9.1 shows the roof substrate (8) after the double-sided self-adhering barrier layer (9) has been bonded to a surface of the roof substrate (8) via the second adhesive layer (5). The roofing membrane (10) is then positioned to cover the upper major surface of the double-sided self-adhering barrier layer (9), as shown in FIG. 9.2. A first portion of the roofing membrane (10) is lifted and a portion of the first release liner covering the first adhesive layer (3) of the double-sided self-adhering barrier layer (9) is removed, as shown in FIG. 9.3. In a subsequent step of the method, the first portion of the roofing membrane (10) is contacted with the first portion of the first adhesive layer (3) before the in FIG. 9.3 shown procedure is repeated with a second portion of the roofing membrane (10) and the first release liner (11), as shown in FIG. 9.4.

Basically, the procedure depicted in FIGS. 9.1 to 9.4 also applies for the method of sealing a roof substrate using the kit-of-parts according to the second alternative embodiment shown in FIG. 8.

The first and second portions of the roofing membrane (10) and/or the single-sided self-adhering roofing membrane (14) preferably make up 35-75%, more preferably 45-55% of the total area of the corresponding lower major surface. According to one or more preferred embodiments, the portions of the roofing membrane (10) and the single-sided self-adhering roofing membrane (14) are lifted in steps E. and E.' of the method such that the membrane becomes folded along its longitudinal direction, as shown in FIGS. 9.2 to 9.4.

According to one or more embodiments, the roof substrate (8) is selected from the group consisting of bitumen, concrete, ceramic, fiber concrete, metal, glass, thermoplastic polymer, rubber, and plywood substrates, preferably from the group consisting of bitumen, concrete, and ceramic substrates.

EXAMPLES

Preparation Self-Adhering Roofing Membranes

The inventive self-adhering roofing membrane was prepared according to the following process.

First a PVC membrane (Sarnafil G410-12, available from Sika Shanghai) having a nominal thickness 1.2 mm was coated with a layer of a solvent-based acrylic pressure sensitive adhesive composition having a solids content of 50% using a coating weight of 120 $g/m^2$. The wet adhesive layer was dried in a drying channel resulting in a first adhesive layer having a coating weight of 60 $g/m^2$.

The first adhesive layer was then covered with a PET-based barrier layer (available from Suzhou Chiyue Company) having a nominal thickness of 20-50 μm. The outer surface of the barrier layer was coated with a second layer of a bitumen-based pressure sensitive adhesive composition using a coating weight of 400 $g/m^2$. Finally, the outer surface of the second adhesive layer facing away from the barrier layer was covered with a siliconized PE release liner having a thickness of about 15 μm.

The prepared self-adhering roofing membrane was tested for various properties as discussed in detail below.

Holding Power

The measurements for the holding power were conducted according to GB/T 23260-2009 standard.

Figure 6:
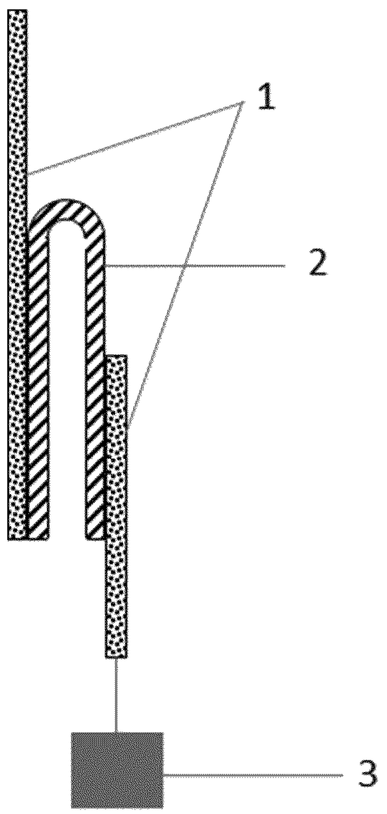
FIG. 6 shows a schematic presentation of the arrangement for measurement of a holding power of a self-adhering membrane.

A sample having dimensions of 150×50 mm was cut from the exemplary self-adhering roofing membrane, folded over itself, and adhered to a first stainless-steel plate and to a second stainless-steel plate via the adhesive layer as shown in FIG. 6 below. The bonding area between the portion of the adhesive layer and the steel plates had dimensions of 50×50 mm. A weight of 1 kg was attached to the lower end of the second stainless-steel plate and the length of the time period between bonding of the sample and adhesive bond failure (detachment of the sample from the steel plate) was recorded.

In FIG. 6, number 1 refers to the first and second stainless-steel plates, number 2 refers to the sample, and number 3 refers to the 1 kg weight attached to the lower end of the second steel plate.

Heat Resistance, 70° C., 2 Hours

For self-adhering roofing membrane comprising bitumen-based PSA as the second adhesive layer, heat resistance at 70° C. was measured according to GB23441-2009 standard as follows.

A sample cut from the tested membrane having dimensions of 125×100 mm was adhered to a plywood substrate having a clean and smooth surface. The membrane sample was contacted with a surface of the substrate and rolled over three times with a press roller having a weight of 2 kg and a width of 50~60 mm to affect adhesive bonding between the membrane and the substrate. The position of one of the short edges of the membrane sample was marked to the plywood substrate before the specimen was hanged in a vertical direction in a heating over with the marked short edge of the membrane pointing downward. The specimen was kept in the oven at a temperature of 70° C. for 2 hours. After the heat-treatment, the specimen was removed from the over the displacement, i.e., the distance that the membrane sample had slipped down from its original adhered position on the plywood substrate, was measured with a precision of less than 0.5 mm.

Low Temperature Flexibility

The measurements for the low temperature flexibility were conducted according to GB 12953-2003 standard. In the measurement, a sample of the tested self-adhering roofing membrane was bended at a temperature of −30° C. and then visually analyzed for the presence of cracks in the polymeric layers.

Shear and Peel Strength

Samples having dimensions of 50×250 mm were cut from the tested self-adhering roofing membrane and bonded via the second adhesive layer to an aluminum plate followed by measurement of the sheer and peel resistances.

The measurements for the peel resistance at an angle of 180° were conducted according to GB/T 23260-2009 standard and for shear resistance according to JCT 863-2011 standard.

Interlayer Peel Strength (Waterproofing Layer-Barrier Layer)

The measurements for interlayer peel strength were conducted according to GB/T 23260-2009 standard using samples having dimensions of 50×250 mm cut from the tested self-adhering roofing membrane.

TABLE 1

| Tested property | | Method | Exemplary roofing membrane | Unit |
|---|---|---|---|---|
| Holding power | | GB/T 23260-2009 | 32 | minutes |
| Heat Resistance, 70° C., 2 hours | | GB/T 23260-2009 | No flow, no crack, no deformation | Visual evaluation |
| Low temperature flexibility, −30° C. | | GB 12953-2003 | No cracks | Visual evaluation |
| Peel strength, aluminum plate | Original | GB/T 23260-2009 | 60.5 | N/50 mm |
| | After water soaking, 7 days | | 60.5 | |
| | After heat-treatment, 70° C., 7 days | | 65 | |
| Shear strength, aluminum plate | Original | JCT 863-2011 | 297 | N/50 mm |
| Interlayer peel strength, PVC-barrier layer | Original | GB/T 23260-2009 | 30 | N/50 mm |
| | After water soaking, 7 days | | 24 | |
| | After heat-treatment, 70° C., 7 days | | 16 | |

The invention claimed is:

1. A self-adhering roofing membrane comprising:

i) a waterproofing layer having a first and a second major surface and comprising at least one polymer P1, ii) a first adhesive layer, iii) a barrier layer comprising a polymeric film comprising at least one polymer P2 selected from the group consisting of polyamide, ethylene vinyl alcohol, and polyester, iv) a second adhesive layer, and v) optionally a release liner, wherein the first and second adhesive layers are pressure sensitive adhesive layers.

2. The self-adhering roofing membrane according to claim 1, wherein the at least one polymer P1 is selected from the group consisting of polyvinylchloride, polyolefins, halogenated polyolefins, rubbers, and ketone ethyl esters.

3. The self-adhering roofing membrane according to claim 1, wherein the waterproofing layer is a polyvinylchloride membrane, comprising:

a) 25-65 wt.-% of a polyvinylchloride resin, as the at least one polymer P1, b) 15-50 wt.-% of at least one plasticizer, and c) 0-30 wt.-% of at least one inorganic filler, all proportions being based on the total weight of the waterproofing layer.

4. The self-adhering roofing membrane according to claim 1, wherein the waterproofing layer has a thickness of 0.5-2 mm.

5. The self-adhering roofing membrane according to claim 1, wherein the first adhesive layer is an acrylic pressure sensitive adhesive layer.

6. The self-adhering roofing membrane according to claim 5, wherein the first adhesive layer comprises at least 50 wt.-%, based on the total weight of the first adhesive layer, of at least one acrylic polymer AP.

7. The self-adhering roofing membrane according to claim 1, wherein the first adhesive layer is a dried layer of a water- or solvent-based acrylic pressure sensitive adhesive composition or a cured layer of a UV- or electron beam curable acrylic pressure sensitive adhesive composition.

8. The self-adhering roofing membrane according to claim 1, wherein the barrier layer is bonded to at least a portion of the second major surface of the waterproofing layer via the first adhesive layer.

9. The self-adhering roofing membrane according to claim 1, wherein at least one polymer P2 is polyethylene terephthalate or polyamide.

10. The self-adhering roofing membrane according to claim 1, wherein the barrier layer has a thickness of 15-150 μm.

11. The self-adhering roofing membrane according to claim 1, wherein the second adhesive layer covers at least a portion of an outer major surface of the barrier layer facing away from the first adhesive layer.

12. The self-adhering roofing membrane according to claim 1, wherein the second adhesive layer is selected from the group consisting of acrylic polymer-, styrene-block copolymer-, butyl rubber, and bitumen-based pressure sensitive adhesive layers.

13. The self-adhering roofing membrane according to claim 1, wherein the second adhesive layer has a thickness of 0.15-1 mm.

14. A fully-adhered roof system comprising a roof substrate and a self-adhering roofing membrane according to claim 1 directly adhered to a surface of the roof substrate via the second adhesive layer.

15. The fully-adhered roof system according to claim 14, wherein the roof substrate is selected from the group consisting of bitumen, concrete, ceramic, fiber concrete, metal, glass, thermoplastic polymer, rubber, and plywood substrates.

16. A method for producing a self-adhering roofing membrane according to claim 1, wherein the method comprises steps of:

I) providing a waterproofing layer and a barrier layer having first and second major surfaces, II) providing a first adhesive layer on the second major surface of the waterproofing layer or on one of the major surfaces of the barrier layer and bonding the barrier layer to the waterproofing layer via the first adhesive layer, III) providing a second adhesive layer on an outer major surface of the barrier layer facing away from the first adhesive layer, and IV) optionally covering an outer major surface of the second adhesive layer facing away from the barrier layer with a release liner.

17. A method for waterproofing a roof substrate, wherein the method comprises steps of:

I. providing a self-adhering roofing membrane according to claim 1,

II. applying the self-adhering roofing membrane onto a surface of the roof substrate such that at least a portion of the outer major surface of the second adhesive layer facing away from the barrier layer is directly connected to the surface of the roof substrate, and III. pressing the self-adhering roofing membrane against the surface of the roof substrate with a pressure sufficient to affect adhesive bonding between the waterproofing layer and the surface of the roof substrate.

18. The method according to claim 17, wherein the roof substrate is selected from the group consisting of bitumen, concrete, ceramic, fiber concrete, metal, glass, thermoplastic polymer, rubber, and plywood substrates.

19. A kit-of-parts comprising:

i. a double-sided self-adhering barrier layer comprising a barrier layer, a first adhesive layer covering at least a portion of an upper major surface of the barrier layer, a second adhesive layer covering at least a portion of the lower major surface of the barrier layer and ii. a roofing membrane comprising a waterproofing layer comprising at least one polymer P1, wherein the double-sided self-adhering barrier layer further comprises a first release liner covering at least a portion of the outer major surface of the first adhesive layer facing away from the barrier layer and a second release liner covering at least a portion of the outer major surface of the second adhesive layer facing away from the barrier layer, or i.' a single-sided self-adhering barrier layer comprising a barrier layer, a second adhesive layer covering at least a portion of a lower major surface of the barrier layer and ii.' a single-sided self-adhering roofing membrane comprising a waterproofing layer comprising at least one polymer P1 and a first adhesive layer covering at least a portion of a lower major surface of the waterproofing layer, wherein the single-sided self-adhering barrier layer further comprises a second release liner covering at least a portion of the outer major surface of the second adhesive layer facing away from the barrier layer and wherein the single-sided self-adhering roofing membrane further comprises a first release liner covering at least a portion of the outer major surface of the first adhesive layer facing away from the waterproofing layer.

20. A method for sealing a roof substrate, wherein the method comprises steps of:

A. providing a kit-of-parts according to claim 19,

B. removing the second release liner and applying the double-sided self-adhering barrier layer onto a surface of the roof substrate such that at least a portion of the outer major surface of the second adhesive layer is directly connected to the surface of the roof substrate, C. pressing the double-sided self-adhering barrier layer against the surface of the roof substrate with a pressure sufficient to affect adhesive bonding between the barrier layer and the surface of the roof substrates, D. positioning the roofing membrane to cover at least a portion of the double-sided self-adhering barrier layer, E. lifting a first portion of the roofing membrane and removing a portion of the first release liner covering a first portion of the first adhesive layer, F. contacting the first portion of the roofing membrane with the first portion of the first adhesive layer, G. lifting a second portion of the roofing membrane and removing a portion of the first release liner covering a second portion of the first adhesive layer, H. contacting the second portion of the roofing membrane with the second portion of the first adhesive layer, and I. pressing the first and second portions of the roofing membrane against the surface of the roof substrate with a pressure sufficient to affect adhesive bonding between the waterproofing layer and the barrier layer or A.' providing a kit-of-parts according to claim 19, B.' removing the second release liner and applying the single-sided self-adhering barrier layer onto a surface of the roof substrate such that at least a portion of the outer major surface of the second adhesive layer is directly connected to the surface of the roof substrate, C.' pressing the single-sided self-adhering barrier layer against the surface of the roof substrate with a pressure sufficient to affect adhesive bonding between the barrier layer and the surface of the roof substrate, D.' positioning the single-sided self-adhering roofing membrane to cover at least a portion of the single-sided self-adhering barrier layer, E.' lifting a first portion of the single-sided self-adhering roofing membrane and removing a portion of the first release liner covering a first portion of the first adhesive layer, F.' contacting the first portion of the first adhesive layer with a first portion of the barrier layer, G.' lifting a second portion of the single-sided self-adhering roofing membrane and removing a portion of the first release liner covering a second portion of the first adhesive layer, H.' contacting the second portion of the first adhesive layer with a second portion of the barrier layer, and I.' pressing the first and second portions of the single-sided roofing membrane against the surface of the roof substrate with a pressure sufficient to affect adhesive bonding between the waterproofing layer and the barrier layer.

* * * * *